April 5, 1960 R. P. MAYER ET AL 2,932,010

DATA STORAGE SYSTEM

Filed May 3, 1956 14 Sheets-Sheet 1

INVENTORS
ROLLIN P. MAYER
RICHARD C. JEFFREY
BENNETT HOUSMAN
DONALD B. THOMPSON
BY
ATTORNEY

April 5, 1960 R. P. MAYER ET AL 2,932,010

DATA STORAGE SYSTEM

Filed May 3, 1956 14 Sheets-Sheet 2

TIMING SYSTEM

April 5, 1960 R. P. MAYER ET AL 2,932,010

DATA STORAGE SYSTEM

Filed May 3, 1956 14 Sheets-Sheet 3

April 5, 1960 R. P. MAYER ET AL 2,932,010

DATA STORAGE SYSTEM

Filed May 3, 1956 14 Sheets-Sheet 4

TIME TAG SYSTEM

April 5, 1960 R. P. MAYER ET AL 2,932,010

DATA STORAGE SYSTEM

Filed May 3, 1956 14 Sheets-Sheet 12

PARITY CORRECTION SYSTEM

United States Patent Office
2,932,010
Patented Apr. 5, 1960

2,932,010

DATA STORAGE SYSTEM

Rollin P. Mayer, Concord, Mass., Richard Carl Jeffrey, Princeton, N.J., and Bennett Housman and Donald Bycroft Thompson, Poughkeepsie, N.Y., assignors, by direct and mesne assignments, to Research Corporation, New York, N.Y., a corporation of New York Application May 3, 1956, Serial No. 582,576

18 Claims. (Cl. 340—174)

The present invention relates to data storage systems and, more particularly, to systems for storing digital data information presented in serial form. While the invention is of general application, it is particularly suitable in systems employing magnetic drum storage and will be described in that connection.

It is found desirable in many forms of data translation systems to provide a time buffer or temporary storage of data information between the data source and point of data utilization. For example, a time buffer permits a high speed data source and a low speed data utilizer or a low speed data source and a high speed data utilizer to be interconnected.

A data translation system of the type last mentioned is disclosed in the co-pending application Serial No. 494,982, filed March 17, 1955, in the names of Robert R. Everett et al., and assigned to the same assignee as the present application. This system utilizes a magnetic drum storage device as a time buffer, and provides relatively high average access time from plural data sources to drum storage by arranging that the access time be a function of the empty or full status of storage registers on the drum. Drum status channels are employed to indicate whether each of successively presented drum registers is empty or full, and the resulting indication is then used to control translation of data from a selected source to the first empty drum register.

While the rate of data translation to storage in a system of the type last described in relatively high, there are many applications where it would be desirable to increase the storage rate to an even higher value than is readily feasible in such systems. To this end, it would be desirable to sectionalize a relatively large quantity of data into smaller data segments, temporarily store each such segment in readiness for final storage, and to effect final storage in an automatic manner by concurrent translation of all data information of each segment into an individual register of the storage drum with the segments being translated one after another in rapid order to storage in successively presented contiguous registers of the drum.

It is an object of the present invention, therefore, to provide a new and improved data storage system having the desirable characteristics last enumerated.

It is a further object of the invention to provide a new and improved data storage system having an appreciably higher rate of message data transfer to storage and thus one capable of operation with larger quantities of data and larger numbers of message data sources than heretofore readily attainable.

It is an additional object of the invention to provide a novel data storage system in which successively presented storage compartments or registers of a storage medium are automatically selected by discrete groups for storage of successive parts or segments of a complete message, and one in which such group selection is accomplished in a simple and reliable manner under control of a relatively simple counter arrangement.

Other objects and advantages of the invention will appear as the detail description thereof proceeds in the light of the drawings forming a part of this application, and in which:

Figs. 10–1, 10–2 and 10–3 represent schematically the arrangement of a system for converting data information presented in serial form to data information in parallel form suitable for storage, and Fig. 10*a* is the circuit arrangement of a modified form of message-source identity generator used in this system;

Figure 12:
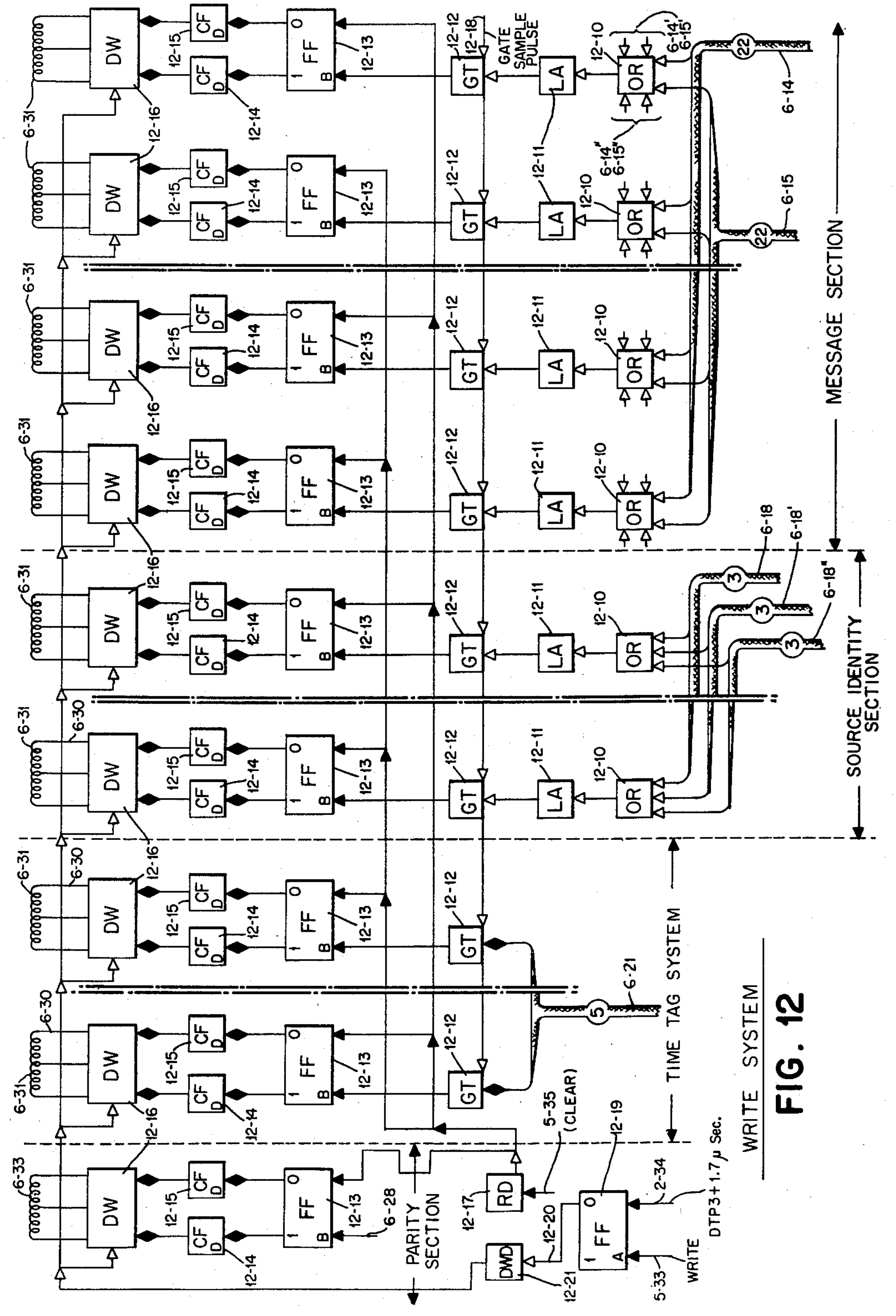
Figures 13, 14, 14A:
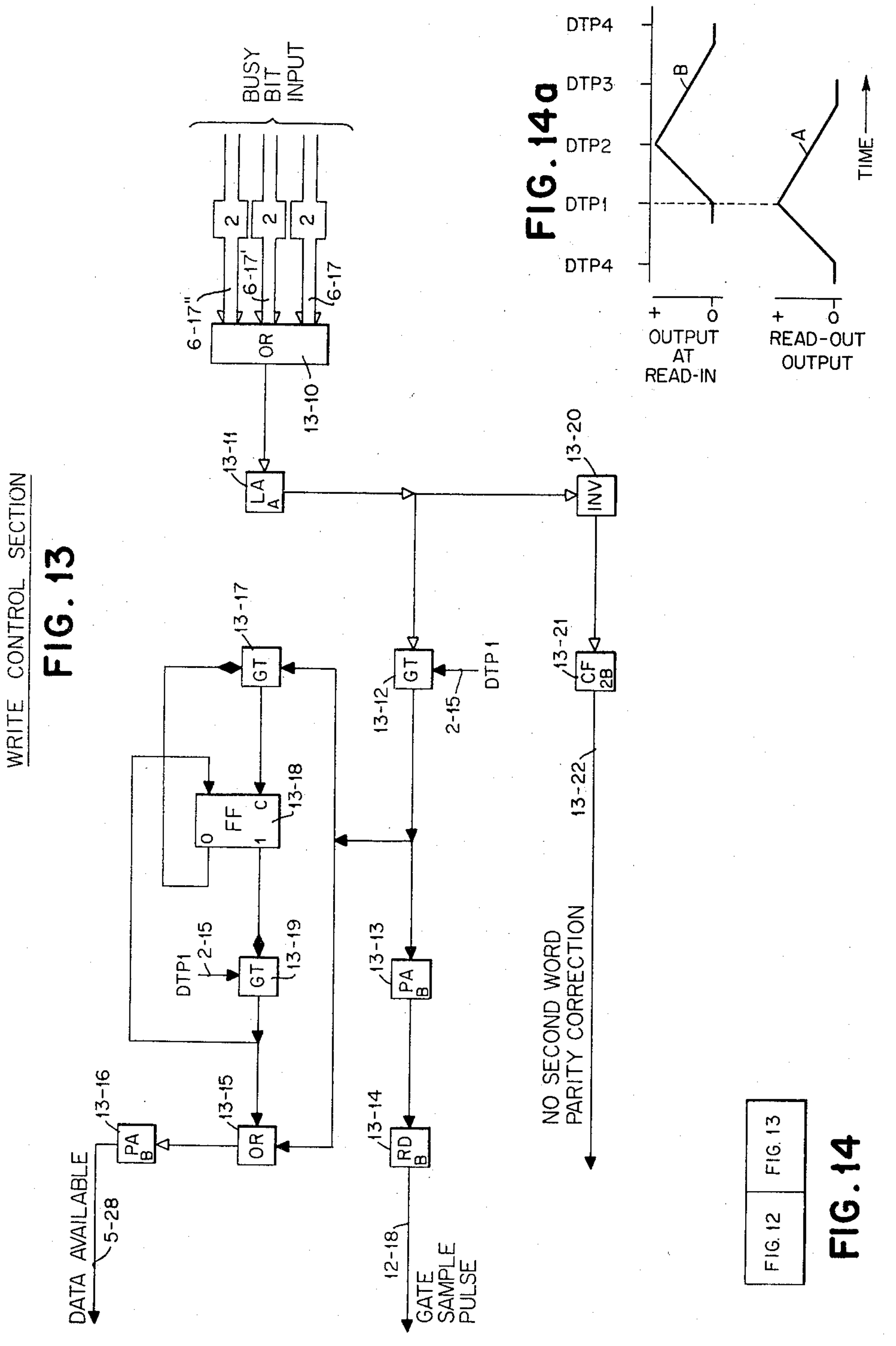
Figure 15:
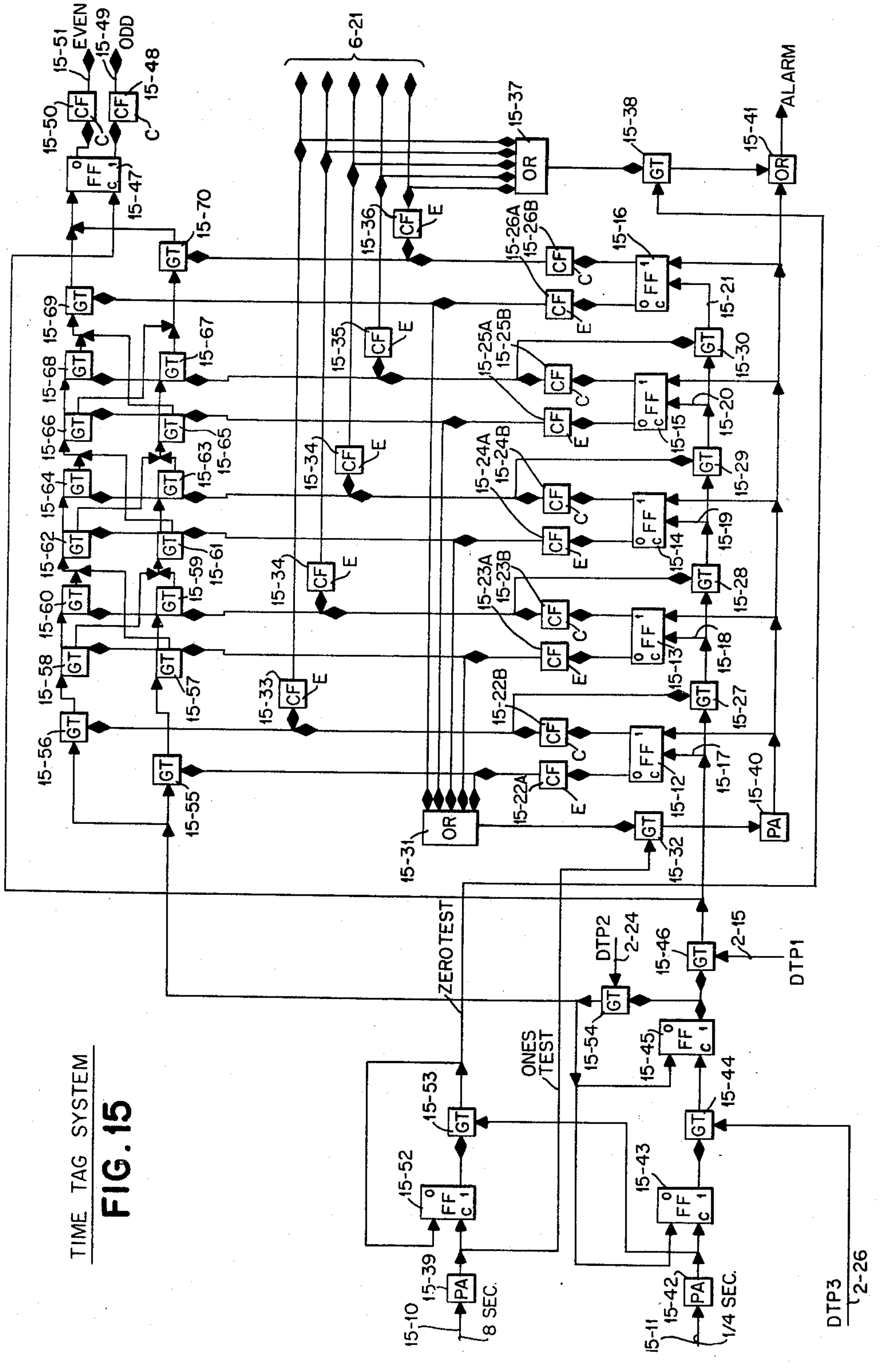
Figure 16:
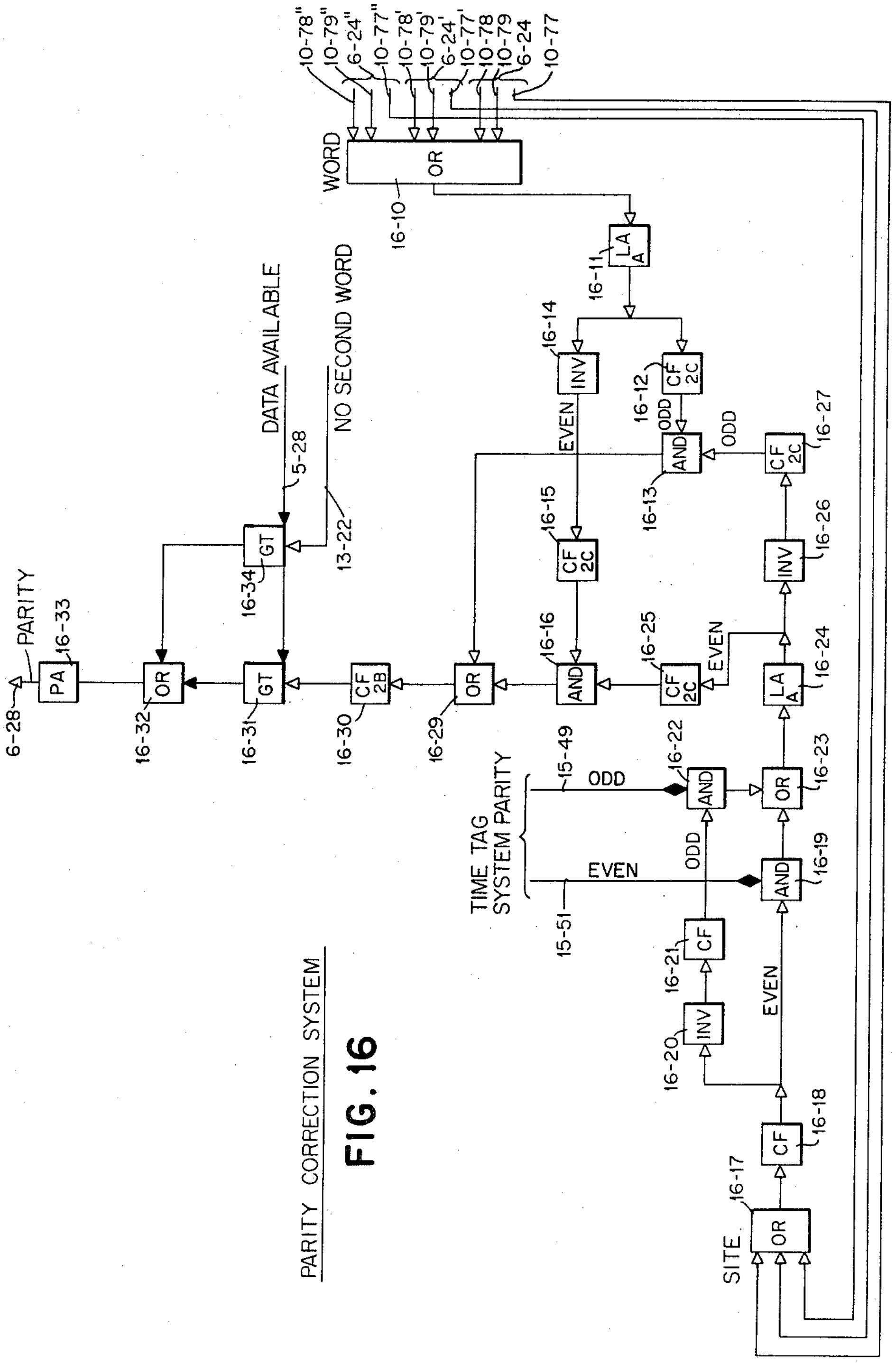
Figure 3:
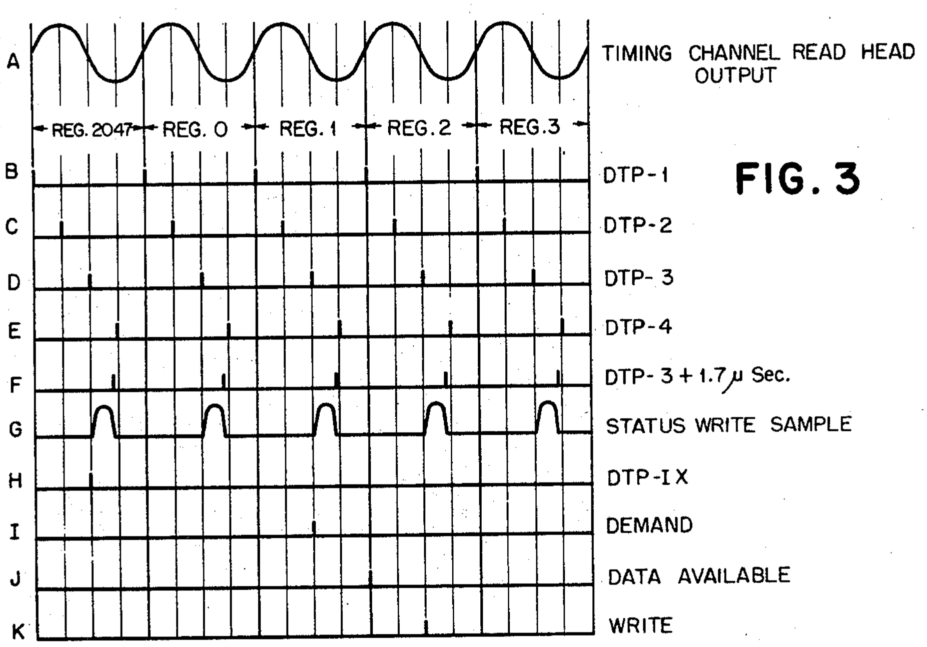
Figure 17:
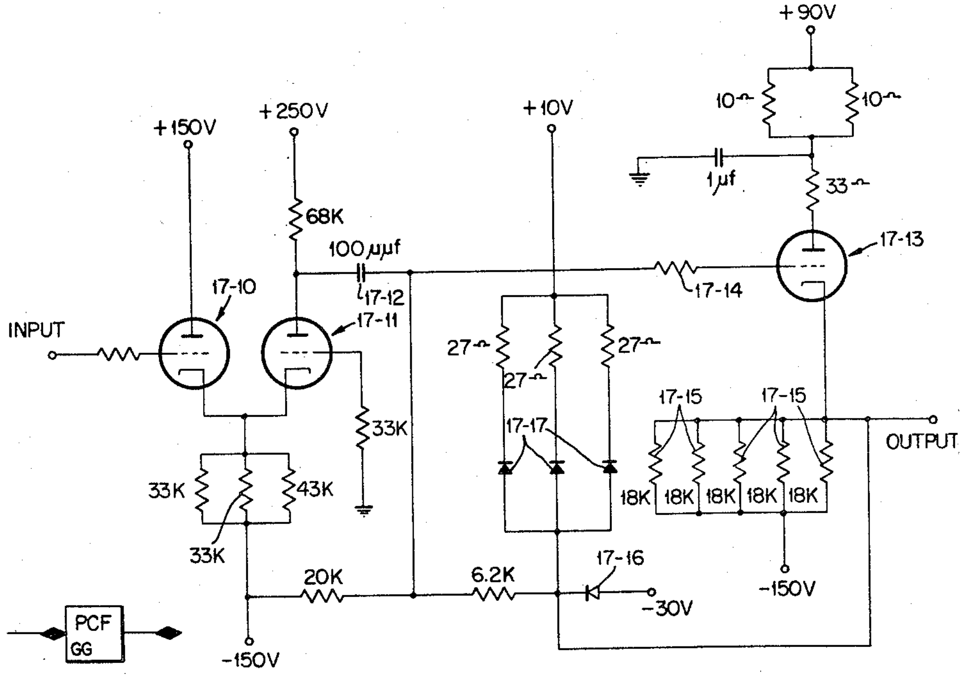
Figure 18:
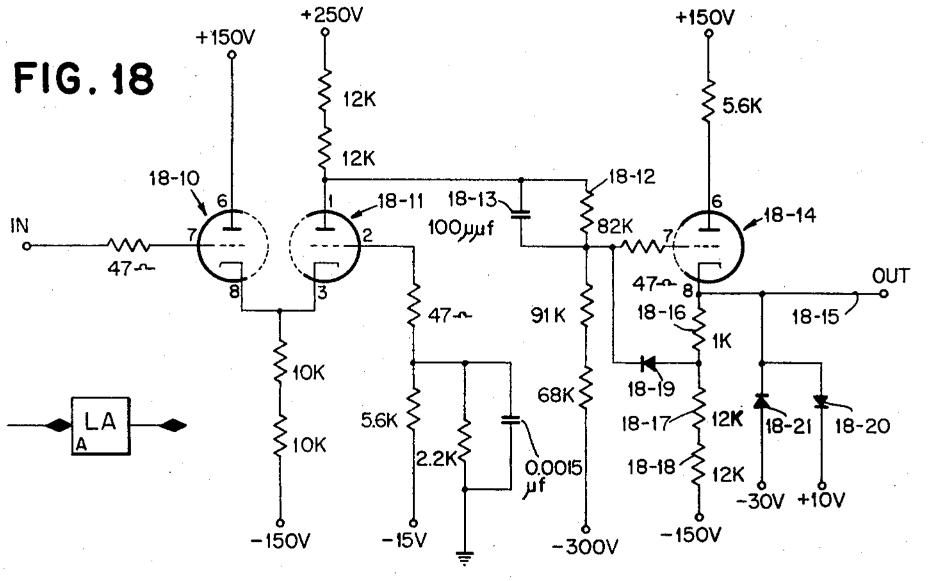
Figure 19:
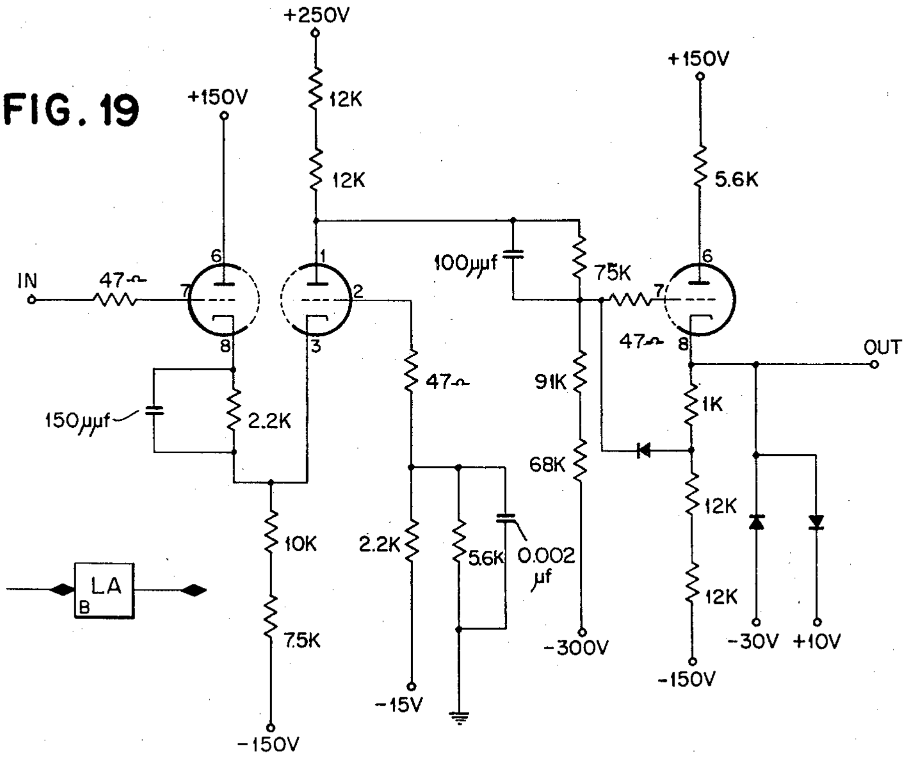

Fig. 12 represents schematically a write system through which data from multiple data sources are translated to storage, Fig. 13 represents a write control system, Fig. 14 shows the manner in which Figs. 12 and 13 should be considered together as a composite structure, and Fig. 14*a* graphically represents certain operating characteristics of core registers pertinent to the operation of the write system function in the data storage system;

Fig. 15 represents schematically a time tag system for identifying the time of receipt of data from each of plural sources;

Fig. 16 shows schematically the arrangement of a parity correction system used in the storage system;

Fig. 17 represents the electrical circuit of a power cathode follower used as a component of the storage system; and Figs. 18 and 19 show the circuits of two slightly different forms of direct current level setters suitable for use as components of the storage system herein disclosed.

*Conventions employed*

Throughout the following description and in the accompanying drawings there are certain conventions employed which are familiar to certain of those skilled in the art. Additional information concerning these conventions is as follows:

In the block diagram figures of the drawing a conventional filled-in arrowhead is employed on lines throughout the drawings to indicate (1) a circuit connection, (2) energization with standard positive pulses, and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof, and at some point intermediate the ends of those cables the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the number of conductors within the cable. The D.C. levels are on the order of 10 volts when positive and 30 volts when negative, whereas pulses indicated by conventional filled-in arrowheads are positive 1/10 microsecond, half-sine, 20 to 40 volts. Pulses indicated by conventional unfilled-in arrowheads are usually considerably longer than 1/10 microsecond in duration and not necessarily sinusoidal, and those referred to hereinafter are in general of the order of 1 to 20 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented; that is, FF identifies a flip-flop, GT a gate circuit, OR a logical OR circuit, and so forth. The character subscripts preceding bold face characters identifying the model of the circuit identified by the bold face character, that is $_{A}$FF identifies the model A flip-flop, $_{C}$FF identifies the model C flip-flop and so forth. These subscripts aid in identifying an individual unit of particular construction and operation, as disclosed in an identified co-pending application, patent or other reference publication named.

An AND circuit develops a pulse output when either coincident pulses are applied to its plural input circuits or develops a D.C. output when coincident unidirectional potentials are applied to the gate. A "gate" is a form of AND circuit in which a pulse output is developed when a coincident D.C. input and a pulse input are applied to its plural input circuits.

In the description, the general arrangement of the apparatus will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an index or table of contents of the description:

TABLE OF CONTENTS

| Section— | Column |
|---|---|
| Conventions employed | 2 |
| Data storage drum organization and operation | 4 |
| Timing system | 6 |
| Write status system | 8 |
| Data storage system general arrangement | 11 |
| Data information input system | 13 |
| Write system | 19 |
| Time tag system | 22 |
| Parity correction | 24 |
| Component construction | 25 |

*Data storage drum organization and operation*

Figure 1:
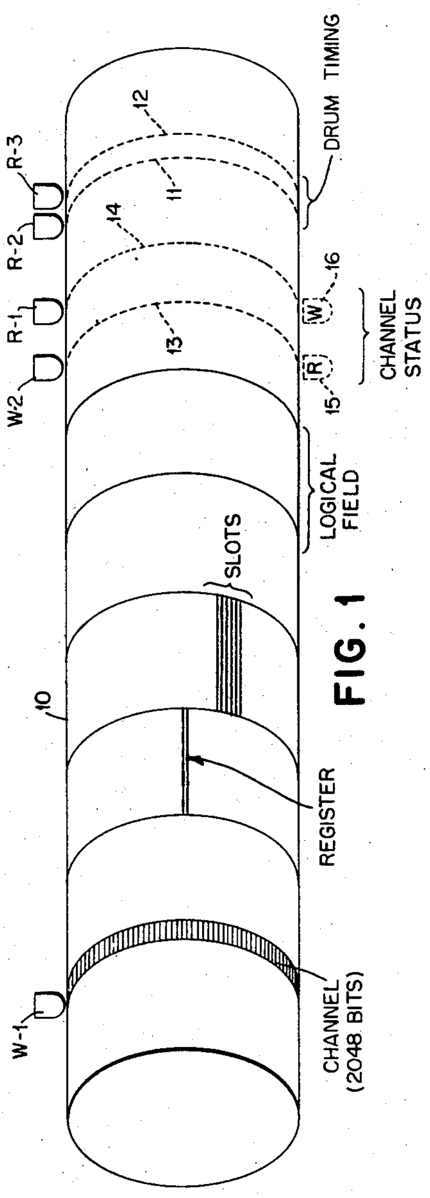
Fig. 1 illustrates a magnetic storage drum and in conjunction with Fig. 1*a* particularly represents the manner of organization of its storage capacity, the mode of individual and successive word storage, and the manner of generating certain drum-controlled timing signals.

A representative magnetic storage drum organization suitable for use in the data storage system of the present invention is illustrated in Fig. 1. The drum 10 is of conventional construction and in a particular application has a diameter of 10.7 inches and a length of 12.6 inches and is driven by a synchronous motor through a toothed belt at an angular velocity of 2,914 revolutions per minute. The drum is usually constructed from a solid block of suitable material, such as brass, and its cylindrical surface is plated with a 0.005-inch layer of magnetic nickel-cobalt alloy.

As the drum rotates, fixed magnetic heads held rigidly in place by bars arranged parallel to the longitudinal axis of the drum transfer information to and from its magnetic surface by recording or writing binary information in the form of small electro-magnetic flux patterns and later detecting or reading these patterns. Fig. 1 shows representative writing heads W–1 and W–2 and several representative reading heads R–1, R–2, and R–3 which are mounted with a small air gap between them and the drum surface.

Figures 1A, 9:
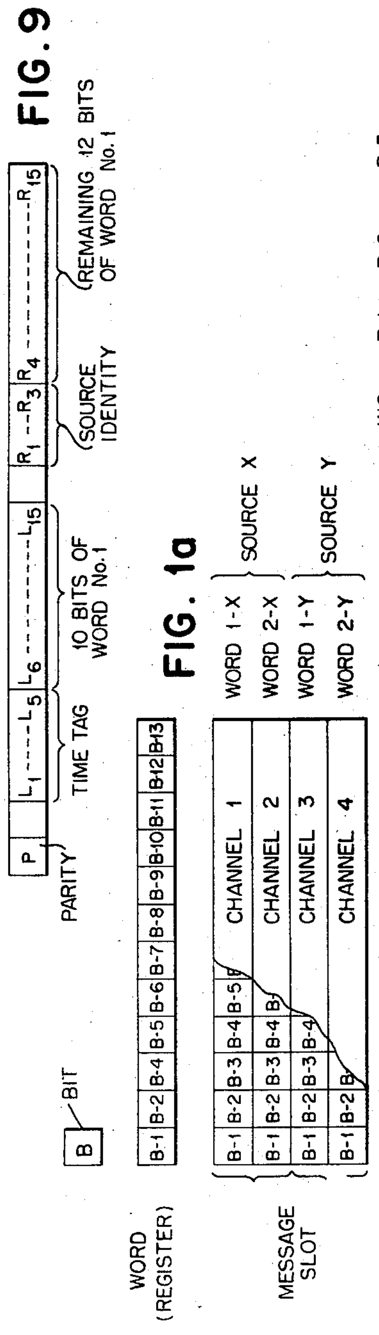
Fig. 9 shows the arrangement of data and related information as ultimately stored by the system.

As indicated graphically in Fig. 1*a* the smallest unit of intelligence that can be written on or read from a drum is called a "bit" indicated by the rectangle B. If the small electromagnetic flux pattern written by a magnetic head is positive the bit is a binary One; if the flux pattern is negative it is a Zero. Once written, a bit is stored on the drum without distortion unless another bit is written over it or it is deliberately erased. Reading from the drum does not in any way distort or alter the bits recorded on the drum surface. As the drum rotates, curved circumferential bands of drum surface, called drum channels, pass under a writing (and corresponding reading) magnetic head. Each word to be recorded on the drum surface includes a plurality of bits, indicated in Fig. 1*a* by way of example as B–1 through B–13, which are concurrently written (or read) by individual physically aligned magnetic heads. These concurrently translated word bits are accordingly stored in individual longitudinally positioned contiguous channels of the drum surface. The number of such contiguous channels for any given drum length depends, of course, upon the maximum length which is selected as being permissible for the longest word to be stored. The rotational velocity of the drum and the timing of its reading and writing operation are such, for example, that each magnetic head can read or write 2,048 bits in each channel of the drum.

In the data storage system herein described, 24 contiguous channels are used for word-bit information and additional channels may be used to contain associated information for each word such as the word parity, source identification and time of word receipt for storage (hereinafter called "time tag"). The contiguous channels in which the word bits and their associated information bits are stored constitute a "logical field" of the drum surface of which a number are provided depending upon the quantity of information to be stored, the number of word sources to be handled in storage, and the like.

The longitudinal section of a drum field onto and from which words are transferred is called a "drum register." In the system described herein, two words may be received from each data source, and the words are stored in consecutive registers (as indicated in Fig. 1*a*) together called a message "slot."

As the drum 10 rotates, a portion of the drum surface (known in the art as a timing channel) passes beneath a reading head R–2. This timing channel, indicated in Fig. 1 as a dotted line 11, is in reality merely a succession of magnetized spots each occupying a space indicating a drum register. These spots are recorded on the drum surface in such a manner that, as the drum rotates, a signal of sine wave form is induced in the associated read head R–2. Assuming that there are 2,048 consecutive registers, there will be 2,048 corresponding equidistantly spaced magnetized spots in the timing channel 11. A second timing channel, indicated by the broken line 12, and designated hereinafter as a drum timing "index" channel (or DTIX channel or pulse signal) passes under another read head R–3. This channel also includes a succession of equidistantly spaced magnetic spots but with the difference that one of these spots is magnetized with opposite magnetic polarity than are all of the other spots of this channel. When this one magnetized spot passes underneath the read head R–3, one sine wave of voltage of opposite phase with respect to the other cycles is induced in the winding of the read head R–3 and serves to identify the reference point for the addressing of all registers and for the accounting of all revolutions of the drum during subsequent operations. The corresponding drum register in which this index bit is written is number 0000, and the other drum registers are then numbered consecutively to number 2,047. The 2,048th is again register number 0000. Since the drum rotates completely once every 20.6 milliseconds at a speed of 2,914 r.p.m., the period between the mid-points of successive registers is approximately 10 microseconds. The timing of voltage developed by the timing read head R–2 accordingly has a period of 10 microseconds and there is developed from this voltage, by a timing system later to be described, four 0.1 microsecond duration pulses having 2.5 microsecond period so that four such pulses occur for each drum register. These pulses are hereinafter designated as DTP1, DTP2, DTP3, and DTP4.

The storage drum 10 further includes two channels, indicated in broken lines as channels 13 and 14, which are used for status control purposes in translating data into or from drum storage. The channel 13 has associated with it a data-storage system write head W–2, and a read head 15 shown in broken lines is associated with this channel but forms a component of the data read-out system which receives and utilizes the stored data information. The status channel 14 has associated with it a data-storage system read head R–1, and a write head 16 shown in broken lines forms a component of the read-out system last mentioned. The status channels 13 and 14 are so used that a stored 1 bit in a status channel indicates a "full" register or register having a word stored in it, and a 0 bit indicates an empty register. The read head R–1 that reads the control status channel of a register is physically positioned ahead of the data information heads that write in the register by an amount equal to the distance traveled by the drum 10 in 10 microseconds. Thus a status indication is provided for each register 10 microseconds before that register starts to pass under the data information heads which write in it.

The operation to provide channel status is such that if the read head R–1 reads a 0 bit indicating that the next register contains no stored word (or that a previously stored word has been transferred from the drum to the data read-out system), a demand pulse is generated by a write status system more fully described hereinafter provided that this next register is an even numbered register. Conversely, if a 1 bit is read by the read head R–1 indicating that the next reigster contains a stored word, a 1 bit is generated by the status system and is applied to the write head W–2. In the event that the read head R–1 indicates that the next channel is empty and the data storage system indicates information is available for entry into storage, the write status system generates and applies to the write head W–2 a 1 bit at the time the information is written into storage on the drum. Conversely, in the case last assumed, if the read head R–1 indicates that the next register is empty but the storage system indicates that no data is available for storage, the write status system generates and applies to the write head W–2 a 0 bit.

It may be mentioned in passing that the read head 15 and write head 16 of the data read-out system utilize the status information of the status channels 13 and 14 in somewhat inverse manner to their use by the data storage system. That is, the read head 15 informs the write out system that data is stored in the next register and is accordingly available for use by the write out system, and the latter generates and applies to its write head 16 a 1 bit if it does not read out and utilizes the stored word of that register or generates and applies to the write head 16 a 0 bit if it reads out the word stored in the register and thus renders the latter available for subsequent word storage.

*Timing system*

Before considering the data storage system as a whole, it will be helpful to describe the arrangement and operation of two component systems exercising overall control of the storage system.

Figure 2:
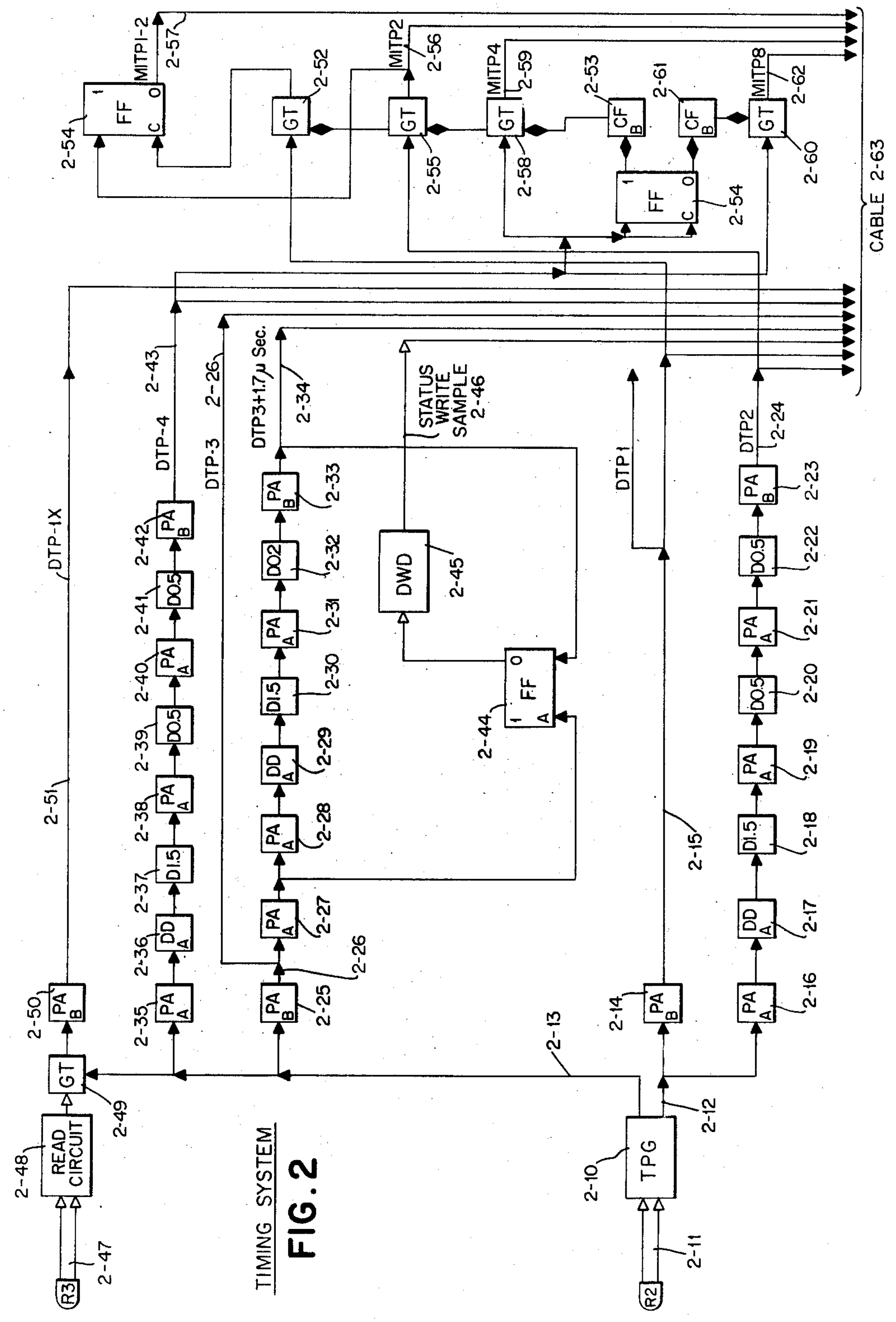
Fig. 2 represents schematically a timing system employed as a component of the data storage system.

One of these is a timing system schematically shown in Fig. 2. This system is essentially similar to a timing system disclosed as Fig. 8 in the above-identified Everett et al. application, to which reference is made for a more detailed explanation of the system arrangement and operation. Briefly considered, the system includes a time pulse generator 2–10 having an input circuit coupled through conductors 2–11 to the timing channel read head R–2 referred to above in connection with Fig. 1. The read head R–2 applies to the time pulse generator 2–10 a voltage of sinusoidal wave form and the generator produces therefrom pulses of short duration, or timing pulses, at each of the input signals zero crossings. There is developed in an output circuit 2–12 of the generator a timing pulse during each of the positive-slope zero crossings of the input voltage, and there is developed in a second output circuit 2–13 of the generator a pulse during each of the negative-slope zero crossings of the input voltage. Fig. 3 graphically represents these voltage relationships more clearly, curve A representing the sinusoidal timing voltage applied by the read head R–2 to the timing generator 2–10, curve B the timing pulses generated in the output circuit 2–12, and curve D the timing pulses developed in the output circuit 2–13.

The timing pulses developed in the output circuit 2–12 are translated through a pulse amplifier 2–14 to develop in an output circuit 2–15 of the latter amplified timing pulses hereinafter identified as drum timing pulse one or "DTP 1."

The timing pulses of the output circuit 2–12 are also translated through a pulse amplifier 2–16 and a delay driver 2–17 to a delay circuit 2–18 which provides 1½ microseconds' pulse delay. These delayed pulses are then translated through a pulse amplifier 2–19 to a delay circuit 2–20 where the pulses are again delayed by ½ microsecond. The latter pulses are likewise translated through a pulse amplifier 2–21 to a third delay circuit 2–22 where the pulses are further delayed ½ microsecond to provide an overall delay of these pulses equal to 2½ microseconds. These delayed pulses are thereafter translated through a pulse ampilfier 2–23 to an output circuit 2–24 of the latter to provide timing pulses delayed 2½ microseconds and hereinafter identified as "DTP 2" pulses. These pulses are graphically shown as curve C of Fig. 3. The sine wave timing potential applied to the generator 2–10 has a frequency of 100 kilocycles per second, or a period of 10 microseconds, so that the DTP 2 pulses are delayed ¼ cycle of the input timing potential.

The timing pulses developed in the output circuit 2–13 of the generator 2–10 are applied through two translating channels essentially similar to that last described except for the time delays involved. One of these channels comprises a pulse amplifier 2–25 having an output circuit 2–26 in which are developed "DTP 3" timing pulses which have a delay of ½ cycle with respect to the input timing potential of the read head R–2. These timing pulses are used directly to time certain operations of the data storage system, and are also translated through tandem arranged units comprising a pulse amplifier 2–27, a pulse amplifier 2–28, a delay driver 2–29, a delay circuit 2–30 providing 1½ microseconds' delay, a pulse amplifier 2–31, a delay circuit 2–32 providing a 2⁄10 microsecond delay and a pulse amplifier 2–33 having an output circuit 2–34 in which are developed the DTP 3 timing pulses but delayed by an additional 1.7 microseconds. The latter pulses are represented by curve F of Fig. 3. The second translating channel through which the timing pulses of the output circuit 2–13 are translated includes tandem arranged units comprising a pulse amplifier 2–35, a delay driver 2–36, a delay circuit 2–37 providing 1.5 microseconds' delay, a pulse amplifier 2–38, a delay circuit 2–39 providing ½ microsecond delay, a pulse amplifier 2–40, a delay circuit 2–41 providing ½ microsecond delay, and a pulse amplifier 2–42 having an output circuit 2–43 in which "DTP 4" pulses are developed having a delay equal to 7.5 microseconds or ¾ cycle with relation to the input timing potential of the read head R–2. The DTP 4 pulses are graphically represented by curve E of Fig. 3.

The DTP 3 pulses amplified by the power amplifier 2–27 are also provided as a pulse input to the One side of a flip-flop 2–44 which has applied to its Zero input side pulses from the output of the pulse amplifier 2–33. Thus a pulse applied to the One input of flip-flop 2–24 is followed 1.7 microseconds later by a pulse applied to its Zero input side to cause the flip-flop 2–44 to produce in its Zero output circuit a negative going pulse of approximately 1.7 microseconds' duration starting at approximately DTP 3 time. This negative going pulse is amplified and inverted by a drum write driver 2–45 to develop in an output circuit 2–46 of the latter pulses hereinafter identified as a "status write sample" pulse and graphically represented by curve G of Fig. 3.

The drum index timing pulses developed in the read head R–3, as explained above in connection with Fig. 1, are applied through a circuit 2–47 to a read circuit 2–48 which develops in its output circuit positive going gating pulses occurring each positive slope zero crossing of the sine wave timing potential developed in the read head R–3. It was earlier explained that one cycle of the latter potential occurs with opposite phase to the other cycles of this potential once each drum revolution. The pulse in the output circuit of unit 2–48 resulting from this one cycle of opposite phase is selected by a gate 2–49 which is conditioned during the time of occurrence of a DTP 3 pulse developed in the output circuit 2–13. The index pulse thus selected by the operation of the gate 2–49 is translated through a pulse amplifier 2–50 to an output circuit 2–51 of the latter, and is hereinafter identified as a "DTP IX" pulse graphically represented by curve H of Fig. 3.

The timing system also generates a number of input timing pulses used to control message input units of the data storage system which change input data from binary series form to binary parallel form in readiness for storage on the storage drum. To this end, the DTP 1 timing pulses are applied to a gate 2–52 which is conditioned through a cathode follower 2–53 from the One output circuit of a flip-flop 2–54 operated in binary fashion by DTP 4 pulses applied both to its One and Zero input sides. The pulses translated by the gate 2–52 are applied to the Zero input side of a flip-flop 2–54. DTP 2 pulses are similarly translated through a gate 2–55, also conditioned by the One output side of the flip-flop 2–54, to develop in the output circuit 2–56 of the latter pulses identified as "MITP 2" pulses having the same timing as the DTP 2 pulses. These pulses are applied from the output circuit 2–56 to the One input side of the flip-flop 2–54. Thus there is developed in the Zero output circuit of the latter pulses having a duration of 2.5 microseconds, starting with a corresponding DTP 1 pulse, and hereinafter identified as "MITP 1–2" pulses. The DTP 4 pulses are also applied to a gate 2–58, conditioned by the One output side of the flip-flop 2–54, to develop in the output circuit 2–59 of this gate pulses identified as "MITP 4" pulses having the same timing as alternate DTP 4 pulses. The DTP 4 pulses lastly are applied to a gate 2–60 which is conditioned by a cathode follower 2–61 from the Zero output side of the flip-flop 2–54 to develop in the output circuit 2–62 of the gate 2–60 pulses identified as "MITP 8" pulses having the same timing as alternate DTP 4 pulses.

Figure 4:
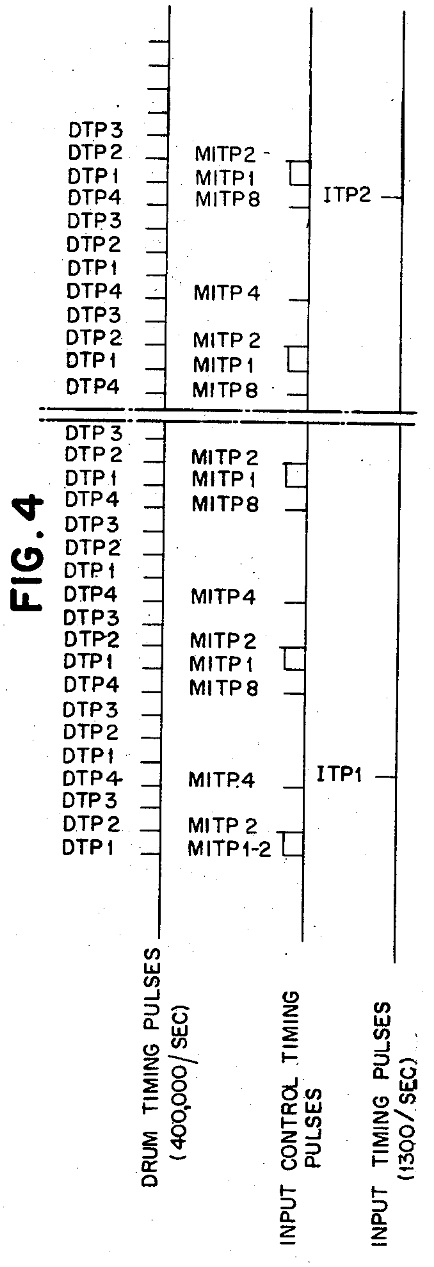
Figs. 3 and 4 represent graphically the time relationships of certain timing pulses generated by the timing system.

In connection with the generation of the message input timing pulses as last described, it will be noted that the DTP 4 pulses cause the flip-flop 2–54 to develop gating potentials alternately in its Zero and One output sides. Thus one DTP 4 pulse results in the opening of gates 2–52, 2–55 and 2–58 to develop MITP 1–2, MITP 2 and MITP 4 pulses while the succeeding DTP 4 pulse causes the flip-flop 2–54 to open the gate 2–60 and develop an MITP 8 pulse. Thus the MITP 1–2, MITP 2, and MITP 4 pulses are developed during only alternate cycles of the timing voltage applied to the timing pulse generator 2–10 whereas the MITP 8 pulses are developed in the intervening cycles of the timing voltage. The relationship of these generated pulses to the DTP 1–DTP 4 pulses is graphically represented in Fig. 4.

*Write status system*

Figure 5:
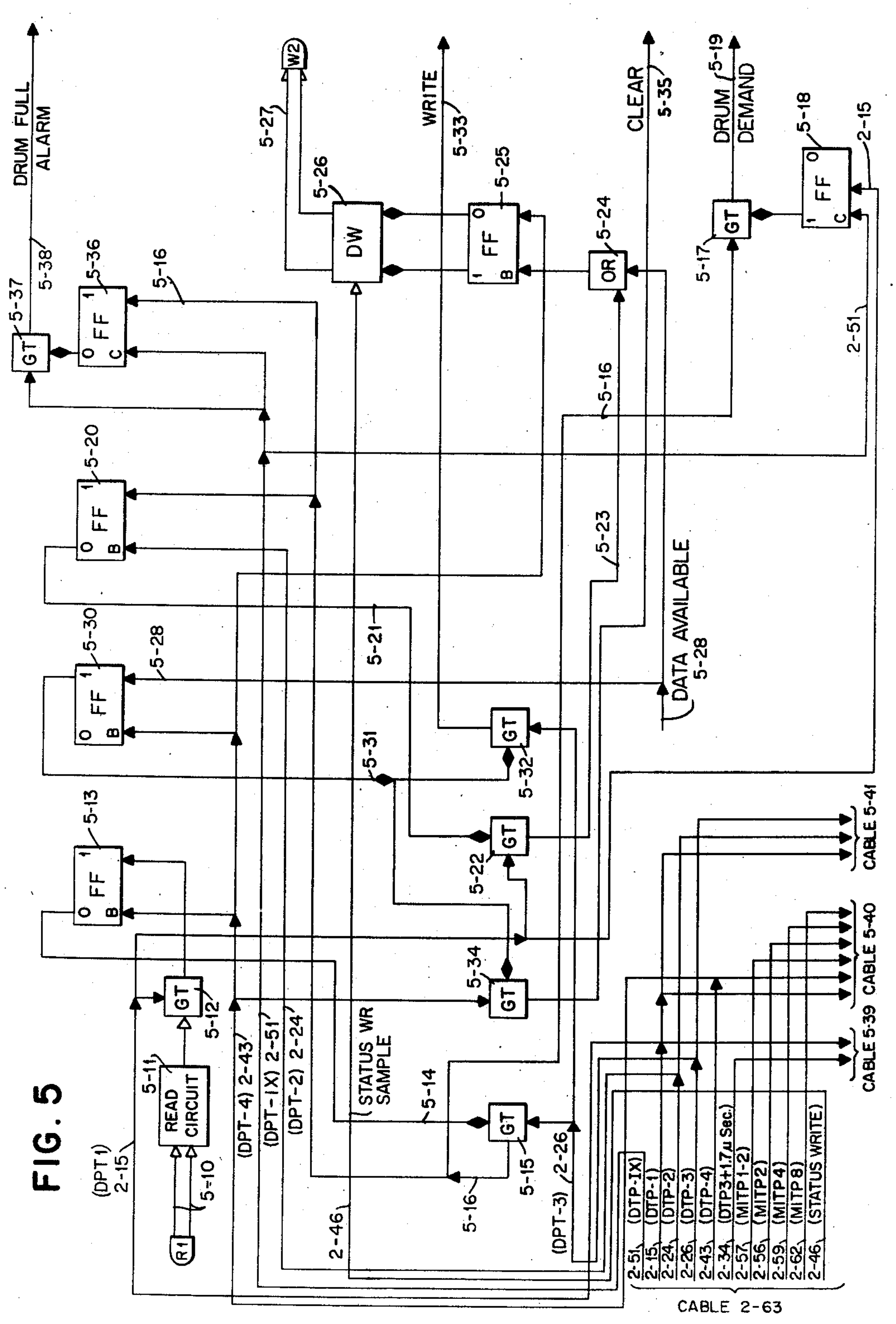
Fig. 5 represents schematically the arrangement of a write status system which forms another component of the storage system.

A second component of the data storage system which exercises overall system control is the write status system schematically shown in Fig. 5.

The function of this system is to ascertain which registers of the storage drum are full and which are empty, to generate a drum demand signal coincident with DTP 3 pulse time when empty registers of the drum are sensed by the system, and to generate a write pulse also coincident with DTP 3 pulse time when the data storage system indicates in response to the drum demand that data is available for storage. The demand pulse is generated by the write status system each time that an empty register status signal is received by it. An empty register signal has a positive slope zero crossing in its wave form which occurs at DTP 1 time, and a full register signal has a positive slope zero crossing in its wave form which occurs at DTP 3 time.

Thus empty and full register signals developed in the read head R–1, mentioned in connection with Fig. 1, are applied through conductors 5–10 to a read circuit 5–11 having a construction shown and described in detail in the aforementioned Everett et al. application. The signal applied to the latter has a wave shape dependent upon the status signals recorded in the status channel 14 (Fig. 1). In the case of all zeros indicating all empty registers, or all ones indicating all full registers, as recorded in the status channel the input to the read circuit 5–11 will be a sine wave of 100 kilocycles per second. The read circuit 5–11 produces a positive going gate pulse during the positive slope zero crossing of the input signal.

In the event that the status signal input to the read circuit 5–11 is representative of a full register, read circuit 5–11 will produce the positive going gate pulse at such a time as to condition a gate 5–12 to translate a DTP 1 pulse applied thereto from the output circuit 2–15 of the timing system previously described. Should the status input signal to the read circuit 5–11 be representative of an empty register, the read circuit generates a positive going gate signal at DTP 3 time as previously explained, so that the gate 5–12 is not conditioned in such event to translate a DTP 1 pulse. A DTP 1 pulse translated by the gate 5–12 in response to a full register will cause a flip-flop 5–13 to be set in its One state, the latter being returned to its Zero state by the succeeding DTP 4 pulse applied from the output circuit 2–43 of the timing system. On the other hand, an empty register signal received by the read circuit 5–11 does not condition the gate 5–12 to translate the DTP 1 pulse and the flip-flop 5–13 remains in its One state and thereby through a circuit 5–14 conditions a gate 5–15 to translate a DTP 3 pulse applied from the output circuit 2–26 of the timing system.

The translated DTP 3 pulse last mentioned is applied from the output circuit 5–16 of the gate 5–15 to a gate 5–17. The latter translates the applied DTP 3 pulse when conditioned by the One state of a flip-flop 5–18 which receives DTP 1 pulses at both its Zero and One input sides and operates in binary manner to assume its Zero and One output side states alternately. From this it will be apparent that the gate 5–17 is conditioned to translate alternate ones of the DTP 3 pulses translated by the gate 5–15, and these alternately translated DTP 3 pulses constitute drum demand pulses appearing in the output circuit 5–19 of the gate 5–17. One such demand pulse is shown in Fig. 3 as curve I.

In summary, therefore, it will be seen that whenever an empty register signal is applied by the read head R–1 to the read circuit 5–11, the operation of the gate 5–15 under control of the flip-flop 5–13 and of the gate 5–17 under control of the flip-flop 5–18 is such that alternate DTP 3 pulses are translated as drum demand pulses. The reason why only alternate DTP 3 pulses are thus used as drum demand pulses is because, as will become more fully apparent during the following description of the complete data storage system, the data information of each data source is comprised by two words which are stored in the storage drum in two successive registers of the latter. To insure that the first storage register of the drum always stores the first word from any data source, the flip-flop 5–18 is set to its One side by the DTP IX timing pulses applied from the output circuit 2–51 of the timing system to the One input side of the flip-flop 5–18 at each index time representing a complete drum revolution. Therefore, an empty register No. 1 of the drum results in translation of the next DTP 3 pulse as a drum demand pulse since the index timing pulse DTP IX has just previously set the flip-flop 5–18 to its One side. The following DTP 3 pulse corresponding to the second register is not then translated as a drum demand pulse, even though the second register is empty, since the preceding DTP 1 pulse has been applied to the flip-flop 5–18 to turn the latter to its Zero output state and thereby shut down the gate 5–17.

The generation of a proper status signal is also an important function of the write status system as earlier mentioned. The write status system should generate a write-a-one signal each time a full register signal is received by the read circuit 5–11, should generate a write-a-one signal if data is available to be stored on the drum, and should generate a write-a-zero signal if an empty register signal is received by the read circuit 5–11 and no data is available to be stored on the drum.

In accomplishing the last-mentioned functions of the write status system, DTP 2 pulses are applied from the output circuit 2–24 of the timing system to the Zero input circuit of the flip-flop 5–20 to set the latter in its Zero state and thereby through its output circuit 5–21 condition a gate 5–22 to translate DTP 1 pulses applied to the latter. The flip-flop 5–20 is returned to its One state by DTP 3 pulses translated by the gate 5–15, so that each such pulse in setting the flip-flop 5–20 to its One state closes down the gate 5–22 and the immediately following DTP 1 pulse is not then translated by the latter. However, the absence of a DTP 3 pulse in the output circuit 5–16 of the gate 5–15 leaves the flip-flop 5–20 set in its Zero state at the following DTP 1 time, so that a DTP 1 pulse is translated through the output circuit 5–23 of this gate and is applied through an Or unit 5–24 to turn a flip-flop 5–25 to its One state. With flip-flop 5–25 in its One state, a drum writer 5–26 is conditioned by a status write sample pulse, applied thereto from the output circuit 2–46 of the timing system, to generate a write-a-one signal which is applied through output circuit 5–27 to the write head W–2. It will therefore be seen that when the read circuit 5–11 has received a full register status signal, no demand pulse is generated and a write-a-one signal is generated and is applied to the write head W–2 of the status write channel 13 (Fig. 1) of the storage drum.

If after generating and transmitting a drum demand pulse to the data storage system, a pulse is received from the latter at DTP 1 time on a conductor 5–28 to indicate that data is available for storage, the latter is translated by the Or Unit 5–24 to set the flip-flop 5–25 in its One state. This conditions the drum writer 5–26 to generate a write-a-one signal in response to a status write sample pulse applied thereto from the output circuit 2–46 of the timing system. It is therefore seen that if data is available to be stored on the drum, the write status system generates a write-a-one signal which is recorded by the write head W–2 in the status channel 13 of the storage drum.

The flip-flop 5–25 is periodically reset to its Zero state by DTP 4 pulses applied thereto from the output circuit 2–43 of the timing system. Since the flip-flop 5–25 is always set in its Zero state at DTP 4 time, the drum writer 5–26 will generate a write-a-zero signal in response to a status write sample pulse applied thereto through circuit 2–46 provided that the flip-flop 5–25 is not changed to its One state prior to the receipt of the status write sample pulse.

The generation of a write pulse, as previously mentioned, constitutes a further function of the write status system. The write pulse should be generated only when data is available to be stored on the drum. To this end, a "data available' pulse appearing at DTP 1 time (curve J of Fig. 3) on the data available circuit 5–28 is used to set a flip-flop 5–30 to its One state. The One state of the flip-flop 5–30 through the output circuit 5–31 of the latter conditions a gate 5–32 to translate the next DTP 3 pulse to a write output circuit 5–33. One such "write" pulse is represented by curve K of Fig. 3. The flip-flop 5–30 is reset to its Zero state by DTP 4 pulses applied to its Zero input circuit from the output circuit 2–43 of the timing system.

The generation of a reset signal is a further function of the write status system. When the flip-flop 5–30 is in its One state by virtue of data available for storage, its output circuit 5–31 in addition to conditioning the gate 5–32 to generate a write pulse at DTP 3 time also conditions a gate 5–34 to translate a DTP 4 pulse, applied to the latter from the output circuit 2–43 of the timing system, to a gate output circuit 5–35. Thus when data is available to be stored on the drum, a write pulse is generated in the output circuit 5–33 at DTP 3 time and a "clear" pulse is generated in the output circuit 5–35 at DTP 4 time.

The write status system also generates a "drum full" alarm signal. To this end, a flip-flop 5–36 is set in its Zero state by a DTP IX pulse applied thereto from the output circuit 2–51 of the timing system at the time the storage drum enters the first register. If between one DTP IX pulse and the next such pulse (corresponding to one complete drum revolution) a DTP 3 pulse has not been translated by the gate 5–15, the Zero output circuit of the flip-flop 5–36 conditions a gate 5–37 to translate the second such DTP IX pulse to the output circuit 5–38 as an alarm pulse indicative of the fact that all registers of the storage drum are full. If, however, a DTP 3 pulse is translated by the gate 5–15, this pulse is applied to the One input circuit of the flip-flop 5–36 to set the latter in its One state and thus close down the gate 5–37. The next DTP IX pulse will set the flip-flop 5–36 again in its Zero state but, due to the inherent delay in the flip-flop 5–36, the gate 5–37 will not be conditioned to pass that index pulse so that an alarm pulse is generated only when the flip-flop 5–36 remains in its Zero state for a complete drum revolution.

Of the timing signals developed by the timing system previously described and supplied to the write status system through cable 2–63, certain of the timing signals are used by the latter system as shown and described above, and certain of the timing output circuits extend out of the write status system in cables 5–39, 5–40 and 5–41 as shown.

*Data storage system general arrangement*

Figure 6:
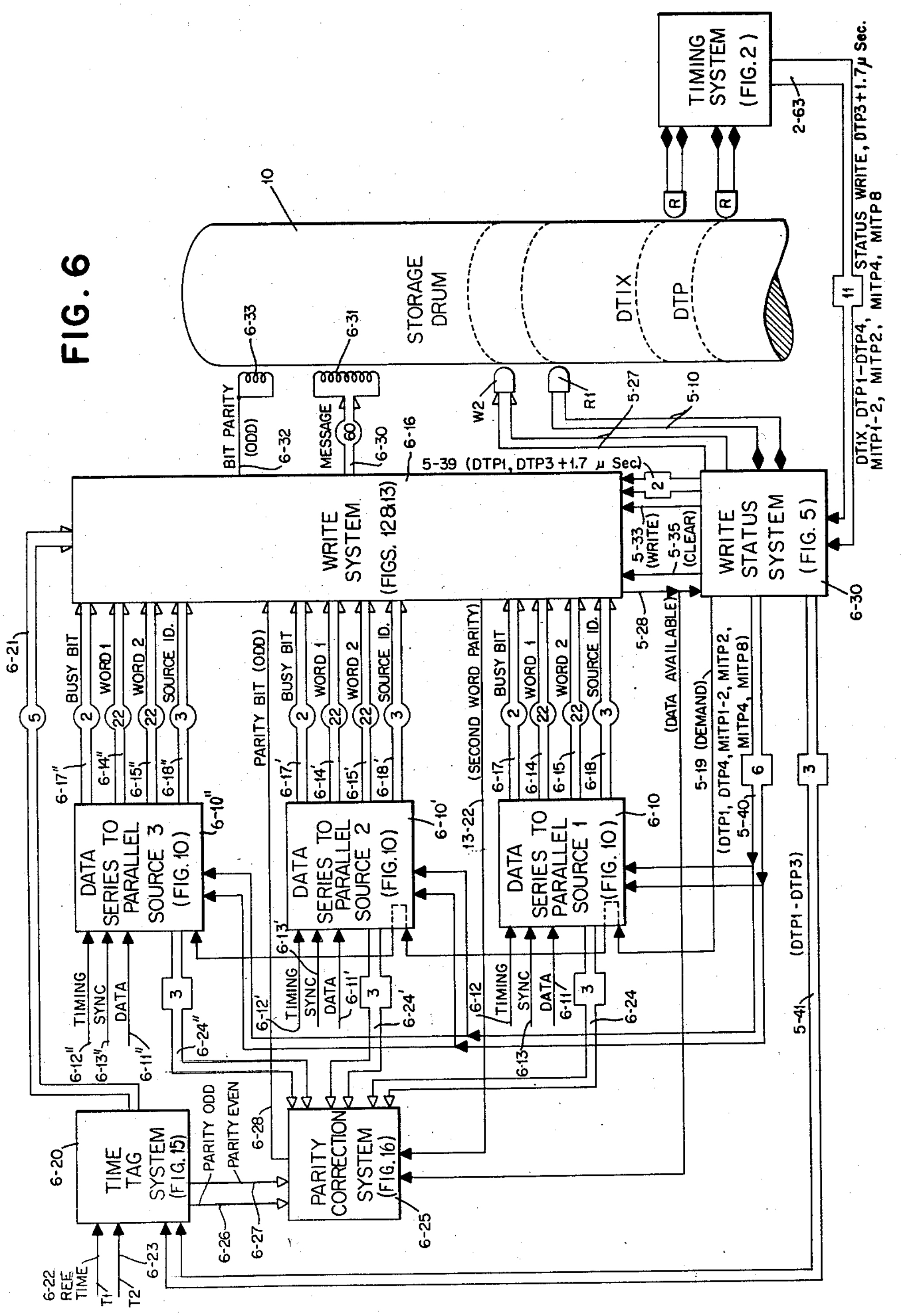
Fig. 6 represents schematically a complete data storage system embodying the present invention in a particular form.

The general arrangement of the data storage system is shown schematically in Fig. 6. By way of illustration, the system is shown as arranged to translate data received from three data sources identified as source 1, source 2, and source 3. This data is applied to a data input system 6–10 for the source 1, 6–10′ for the source 2, 6–10″ for the source 3 having the same circuit arrangement and mode of operation as shown and described more fully hereinafter. Each input system operates to take the data presented in binary series form and convert it to output data in binary parallel form.

Figure 7:
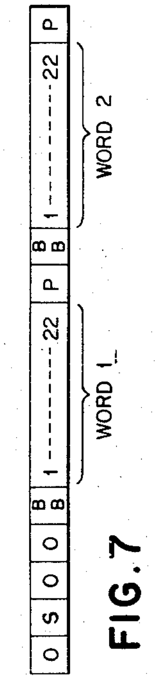
Fig. 7 represents graphically the arrangement of serially presented information bits supplied from a data source to the system for storage.
Figure 8:
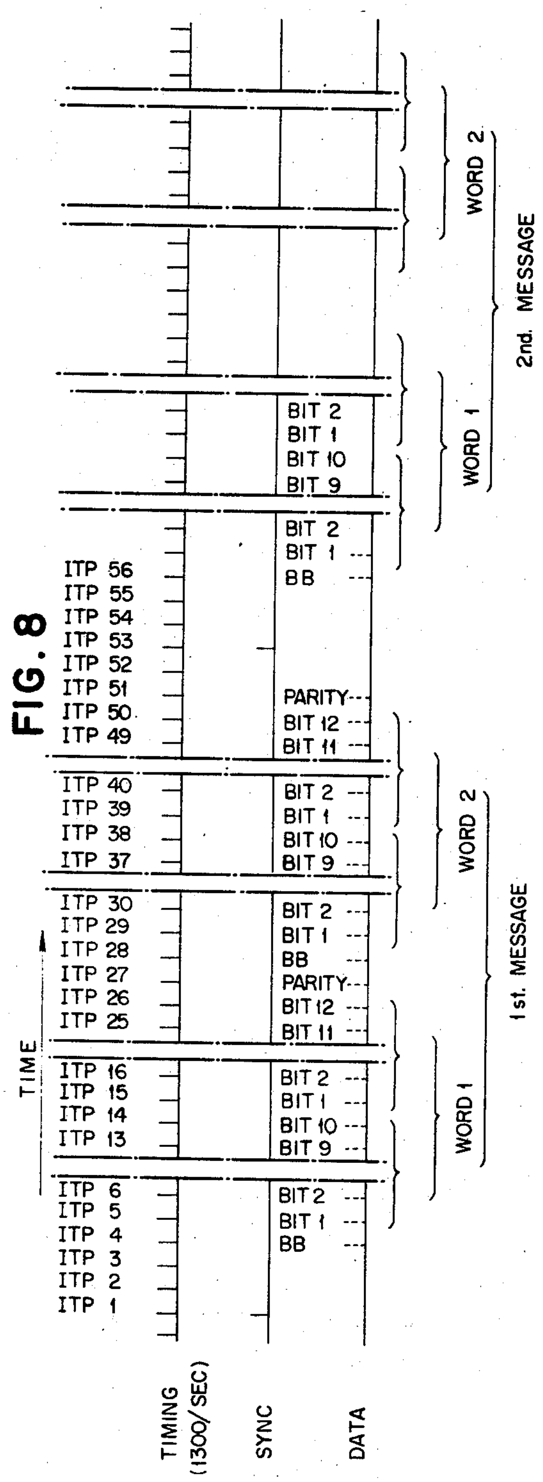
Fig. 8 represents certain timing relationships associated with the received data information bits.

The data received from each source in binary series form has a bit composition as represented in Fig. 7. It is received in a data circuit 6–11 and is accompanied by timing pulses received in a timing circuit 6–12 and Sync pulses received in a Sync circuit 6–13. Fig. 8 shows the timing relationship of the received Sync pulses, timing pulses, and data bits of a received message. Each Sync pulse occurs coincident in time with one of the timing pulses, for example the timing pulse ITP 1 as indicated in Fig. 8. Beginning with the other timing pulse following the Sync pulse, a pulse or no pulse coincident in time with corresponding timing pulses will be received on the data input circuit 6–11, the presence of a pulse indicating a binary One and the absence of a pulse indicating a binary Zero. The bit coincident in time with timing pulse ITP 4 is called a "busy" bit and if present indicates that a message follows. As indicated in Figs. 7 and 8 a message has two words and each could be said to have two half-words. Message bits 1 through 10, coincident with timing pulses ITP 5 through ITP 14, could be said to be the first half-word or left half-word. The second group of data bits 1 through 12, coincident with timing pulses ITP 15 through ITP 26 could be said to be the second half-word or right half-word. The bit coincident with ITP 27 is called a parity bit and is either a pulse or no pulse dependent upon the number of binary Ones in the word. In the system herein described, the parity operation requires that the sum of binary Ones in each word when added to the parity bit must result in an even number.

The second Sync pulse occurs at ITP 53 time, and the busy bit for the next message occurs at ITP 56 time. The second message, like the first message, could be said to have two words, each word having two half-words.

The input system 6–10 receives a message from its associated source in binary series form and converts and stores the message as two words each in binary parallel form. If now a drum demand pulse is received by the system 6–10 from the demand circuit 5–19 of the write status system previously described, and if the input system contains two words in storage in readiness to be stored on the storage drum, the data bits comprising the first word of the message are delivered to a 22 conductor cable 6–14 and 10 microseconds thereafter the data bits of the second word of the message are delivered to a 22 conductor cable 6–15. The successive words translated through the cables 6–14 and 6–15 are applied to a write system 6–16, described more fully hereinafter. In the event that the input system 6–10 does not store a message in readiness for drum storage, the demand pulse supplied from the output circuit 5–19 of the write status system is automatically channeled through the input system 6–10 and is applied to the input system 6–10′. If the latter contains two words stored in readiness for storage on the drum, it operates as explained for the system 6–10 or otherwise automatically channels the demand pulse to the system 6–10″ also having the same mode of operation as the system 6–10.

When any of the input systems deliver words to the write system 6–16, it also delivers to the latter through a 2 circuit cable 6–17 the two busy bits associated with the two delivered words and further delivers through a 3 circuit cable 6–18 a 3 bit word in binary parallel form identifying the particular source from which the message originated. In this, each source is identified by a distinctive identifying word as will be explained more fully hereinafter in the detailed description of the input system.

There is recorded with the message on the storage drum the time at which the message was received from its data source. To this end, a time tag system 6–20 continuously applies to the write system 6–16 through a 5 conductor cable 6–21 time signals representative of the instantaneous count of one pulse every 0.25 second from the occurrence of a time reference pulse received by the time tag system every eight seconds. This eight second pulse is applied to the system 6–20 through a circuit 6–22 from a master time system, not shown, which also supplies to the system 6–20 through a circuit 6–23 the 0.25 second pulses.

As previously mentioned, each word of the message includes a parity bit which is used by the input system 6–10 to identify the fact that all data bits are received by it from the data source. After the two words are arranged in storage to be delivered in parallel by the input system 6–10 to the write system 6–16, the input system delivers the two parity bits of the two words and a parity bit count of the source identity word (produced by the input system) through a 3 conductor cable 6–24 to a parity correction system 6–25. The latter also receives from the time tag system 6–20 through conductors 6–26 and 6–27 respective parity odd and parity even information of the time tag which the system 6–20 applies at every moment to the write system 6–16. The parity correction system 6–25 so operates that it produces in an output circuit 6–28 and applies to the write system 6–16 a parity information bit which the write system 6–16 translates to the storage drum for storage with the message.

The write system 6–16 upon receiving the two 22 bit words, the two busy bits, and the source identification word from an input system 6–10 transmits through the circuit 5–28 to the write status system 6–30 (previously described) a data available pulse. This causes the latter system to generate and apply through its output circuit 5–33 to the write system a write pulse generated in a manner previously explained. The data available pulse is also applied to the parity correction system 6–25 to cause the parity bit information to be applied by the latter back to the write system as earlier mentioned. The write pulse applied to the write system 6–16 by the write status system causes the write system to transmit through a 60 conductor cable 6–30 (there being two conductors for each of the 30 information-bit channels) to individual write heads collectively shown as 6–31, and through a write output circuit 6–32 to a write head 6–33 the parity bit information, the message together with its time tag and source identification for storage on the drum 10. Thereafter the write status system 6–30 generates and applies through its output circuit 5–35 to the write system 6–16 a "clear" pulse which clears the write system to receive a succeeding message from the same or another source.

The information bit format of the message thus stored on the storage drum 10 is shown in Fig. 9. As will be seen from Fig. 9, and starting from the left, the first bit is the parity bit and is either a pulse or no pulse (binary One or Zero) dependent upon the number of binary Ones in the remaining 32 bits of the message. The parity bit makes the total number of binary Ones in the message an odd number. To illustrate by way of example that the stored information may be spread out in a register and need not utilize every channel thereof, the channel following the parity channel is left blank while the bits L1–L5 are the time tag information representing the binary count for the number of 0.25 second pulses received since the last 8 second pulse from the reference time source. The bits L6 through L15 are the bits of the left half-word of the first word of the message, and these are followed by way of example by a blank channel. The bits R–1 through R–3 are a binary code which identifies the source from which the message originated. The bits R–4 through R–15 are the bits of the right half-word of the first word of the message. While not shown, the bit assignments of the second word of each message may be identical to the bit assignments of the first word. However, for certain applications it may be desirable not to record the time tag or source identity information for the second word of the message but rather to use this storage space for storing other information bits as desired.

*Data information input system*

Figures 1, 10, 10A:
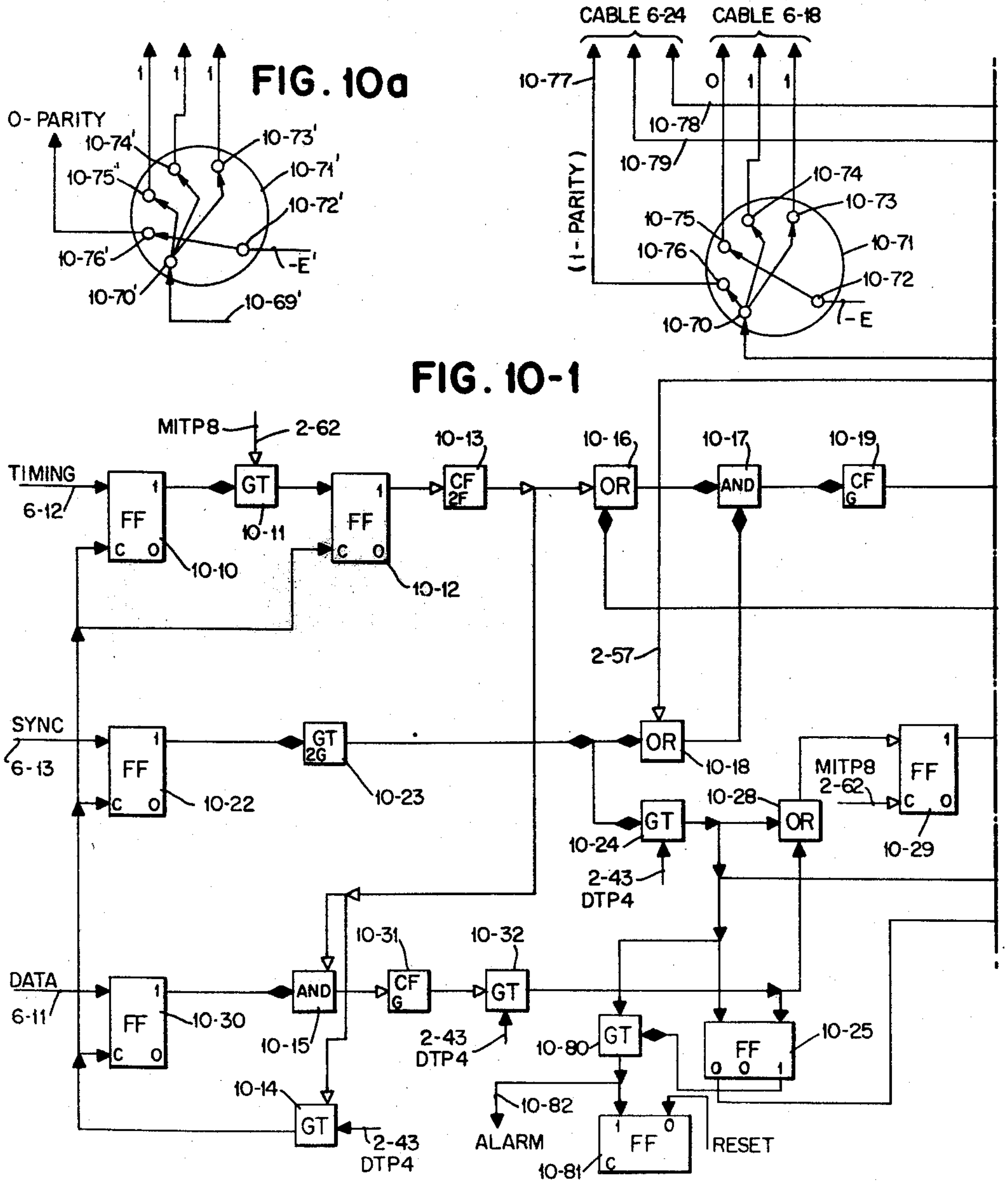
Figures 2, 10:
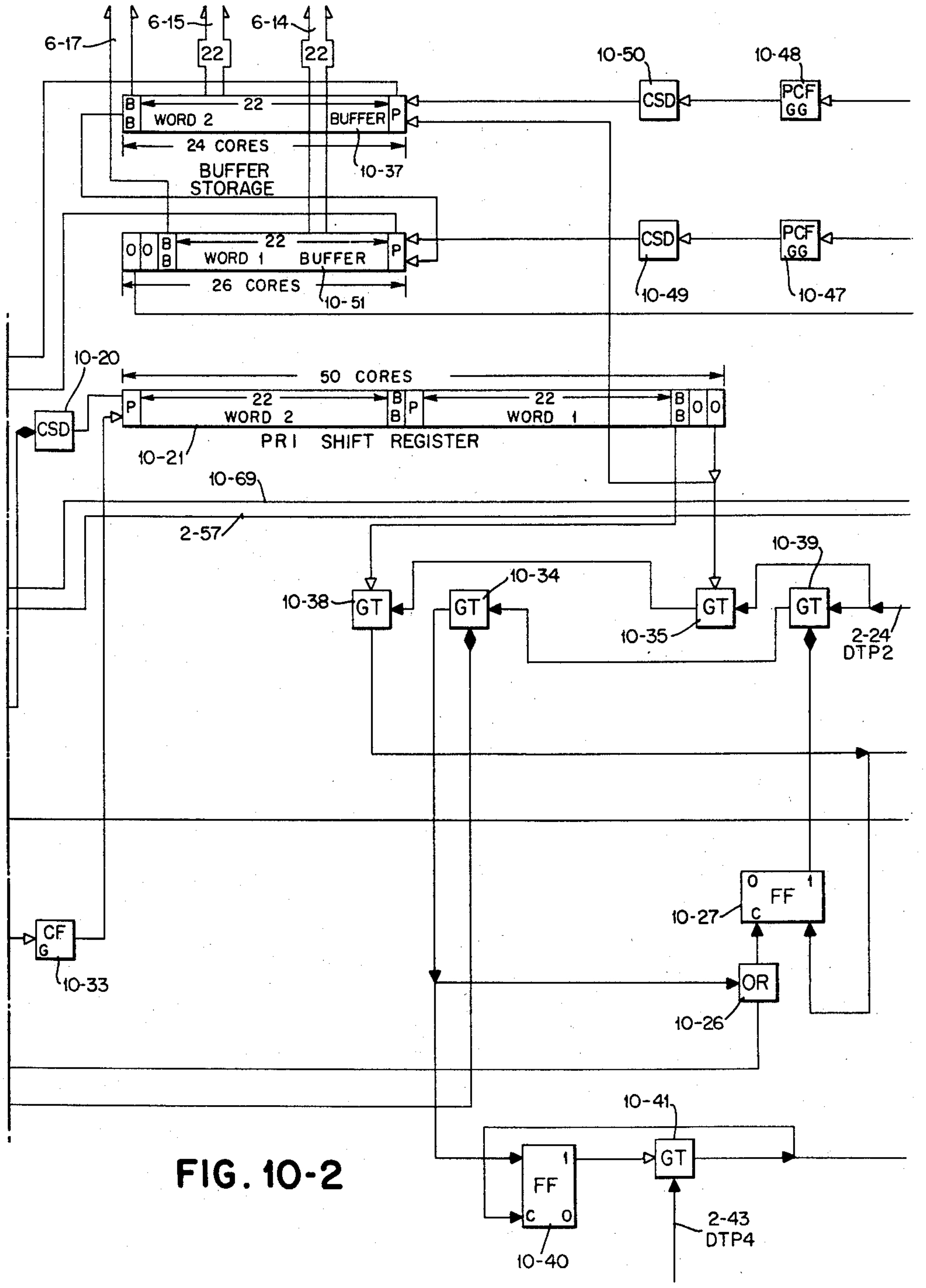
Figures 3, 10:
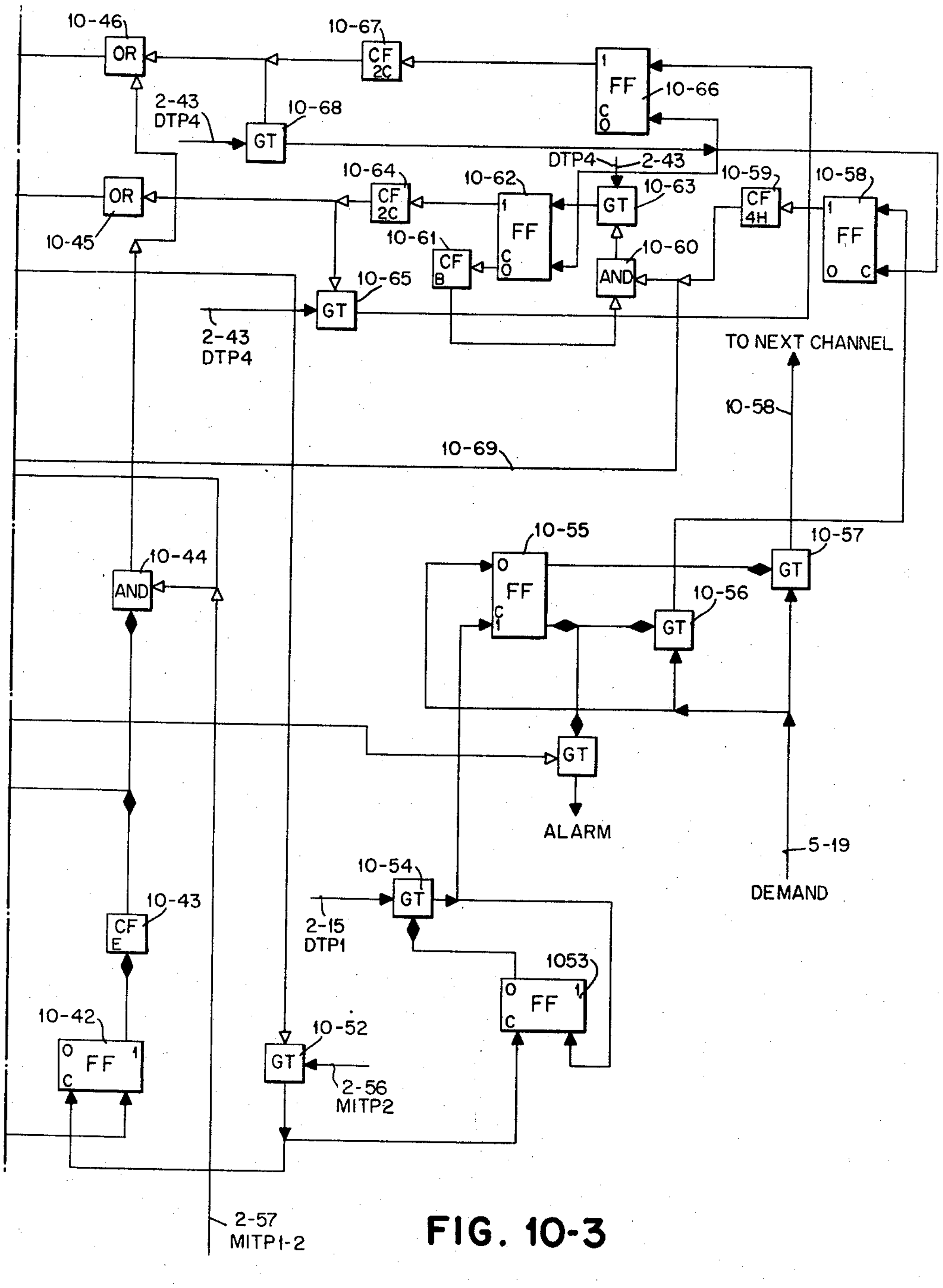

The data information input system identified as 6–10 in Fig. 6 has a circuit arrangement shown schematically in Fig. 10.

Each timing pulse received through a timing circuit 6–12 from a data source sets a flip-flop 10–10 in its One state which conditions a gate 10–11 to translate the next MITP 8 pulse applied to the gate from the output circuit 2–62 of the timing system. It will be understood that the timing pulse may occur at any time relative to the MITP 8 pulse. The latter pulse when translated by the gate 10–11 sets the flip-flop 10–12 in the One state which, through a cathode follower 10–13 performs three functions: (1) conditions a gate 10–14 to translate the next DTP 4 pulse applied to this gate from the output circuit 2–43 of the timing system, (2) conditions an AND circuit 10–15, which translates data information as will presently be explained, and (3) through an OR unit 10–16 conditions an AND circuit 10–17. The next DTP 4 pulse translated by the gate 10–14 resets the flip-flop 10–10 to its Zero state. The operation thus far described has resulted in conditioning the gate 10–14 and the AND circuits 10–15 and 10–17 from MITP 8 time to DTP 4 time or 10 microseconds. Assuming that no Sync pulse from the Sync input circuit 6–13 or data pulse from the data input circuit 6–11 was received with the timing pulse of the timing input circuit 6–12, an MITP 1–2 pulse is applied from the output circuit 2–57 of the timing system to an OR unit 10–18 and is applied by the latter to the AND circuit 10–17. This pulse of 2.5 microseconds' duration is translated by the latter and is further translated by a power cathode follower 10–19 to a core shift driver 10–20. The latter thereupon delivers to the shift windings of a 50 stage primary core shift register 10–21 a shift pulse which causes a one position shift operation of the register. This magnetic core shift register may be of the type shown and described in the co-pending application of Hawley K. Rising et al., Serial No. 502,-634, filed April 20, 1955, entitled "Counter Circuit," and assigned to the same assignee as the present application.

Assume now that a message is about to be received through the input circuit 6–11 from a data source. As noted previously in connection with Fig. 8, this message is preceded by a Sync pulse received at the input circuit 6–13. When the Sync pulse and its corresponding timing pulse are received at respective input circuits 6–13 and 6–12, the flip-flop 10–10 and a flip-flop 10–22 are both set in the One state. The One output of flip-flop 10–22 is applied through a cathode follower 10–23 and the OR unit 10–18 to the AND circuit 10–17 which is previously conditioned for 10 microseconds by the operation of the flip-flop 10–10 in response to the timing pulse. The cathode follower 10–19 and core shift driver 10–20 are now energized for 10 microseconds, instead of 2½ microseconds as previously described, and the shift windings of the core shift register 10–21 are similarly energized for 10 microseconds. When the shift windings of the register 10–21 are energized for this length of time, any data previously stored in the register is destroyed and all cores are set to the Zero state since a One which is attempting to be transferred from one core to another of the register will be drowned out by the long duration shift current.

The flip-flops 10–10 and 10–22 are reset to their Zero state by the next DTP 4 pulse translated by the gate 10–14, but while the flip-flop 10–22 is in its One state it conditions a gate 10–24 to translate the next DTP 4 pulse applied thereto from the output circuit 2–43 of the timing system. This tranlated DTP 4 pulse performs three functions: (1) it sets a flip-flop 10–25 in its Zero state; (2) the pulse is translated through an OR unit 10–26 to set a flip-flop 10–27 in its Zero state, and (3) the pulse is translated through an OR unit 10–28 to set a flip-flop 10–29 in its One state. The latter is reset to its Zero state by the next MITP 8 pulse which is applied to its Zero input circuit from the output circuit 2–62 of the timing system, and thus remains in its One state for 10 microseconds beginning at approximately the same time as the end of the shift current from core shift driver 10–20. This operation of the flip-flop 10–29 results in "priming" (setting a One in the first stage) of the primary shift register 10–21 through a cathode follower 10–33.

As previously noted, the first and second bits following the Sync pulse of an incoming message are "blank" bits. A "blank" bit is represented by a pulse on the timing input circuit 6–12 and no pulse in the Sync input circuit 6–13 or the data input circuit 6–11. A blank bit has a result that the flip-flop 10–10 conditions the AND circuit 10–17 for 10 microseconds, and the flip-flop 10–22 remaining in its Zero state since no Sync pulse is received, the MITP 1–2 pulse translated by the OR unit 10–18 and the AND circuit 10–17 and further translated by the cathode follower 10–19 and core shift driver 10–20 produces a 2.5 microsecond pulse in the shift windings of the register 10–21 so that the One which was inserted in the first core of the register 10–21 as previously explained is now transferred to the second core of the register. The One upon being transferred from the first to the second core of the register is replaced by a Zero in the first core, since the flip-flop 10–22 remains in its Zero state as does also a data input flip-flop 10–30. In response to the second "blank" bit following the Sync pulse, the One stored in core two of the register 10–21 is transferred to core three and the first and second cores store Zeros by an operation in all respects like that last described.

If a data bit received at the data input circuit 6–11 is Zero, the operation of the primary shift register 10–21 is the same as that previously described for blank bits since the flip-flop 10–10 will be in its One state for 10 microseconds and flip-flops 10–22 and 10–30 will be in their Zero states. If, however, the data bit of the input circuit 6–11 is a One, it sets the flip-flop 10–30 to its One state at the time the flip-flop 10–10 is set in its One state. The flip-flop 10–10 conditions the AND circuit 10–17 to translate an MITP 1–2 pulse as previously described to result in a one position shift operation of the register 10–21. Flip-flop 10–30 in its One state, together with the One states of flip-flops 10–10 and 10–12, conditions the AND circuit 10–15 to provide a positive output pulse 10 microseconds in duration beginning shortly after MITP 8 time (delayed slightly due to the rise time of the flip-flop 10–12 and delay of cathode follower 10–13). The output pulse developed by the AND circuit 10–15 is translated through a cathode follower 10–31 to condition a gate 10–32 to translate the next DTP 4 pulse applied thereto from the output circuit 2–43 of the timing system. This pulse translated by the gate 10–32 is applied through the OR unit 10–28 to set the flip-flop 10–29 in its One state for 10 microseconds since it is set to Zero again by an MITP 8 pulse as earlier mentioned, therefore, after the shift pulse from the core shift driver 10–20 has completed the shift of the register 10–21, the flip-flop 10–29 through the cathode follower 10–33 causes the first core of the primary shift register 10–21 to be set in the One state. The output pulse from the gate 10–32 is also applied to the flip-flop 10–25, operating with respect to this pulse in binary fashion, so that the latter will be in its Zero state only when the total number of Ones in the received data is even. Although the Zero output circuit of the flip-flop 10–25 conditions a gate 10–34, no pulses will be applied to the latter (due to timing relationships presently to be explained) until the flip-flop 10–25 has been set in its One state.

On receipt of the 50th timing pulse from the input timing circuit 6–12, the primary shift register 10–21 is shifted one more step and at this time the priming pulse (which resulted from the initially received Sync pulse at the Sync input circuit 6–13) is transferred from the 50th or last core of the register. This transferred priming pulse not only conditions a gate 10–35 to translate the next DTP 2 pulse applied thereto from the output circuit 2–24 of the timing system, but also through the output circuit 10–36 of the register 10–21 causes a One to be set in the first core of a word two core buffer storage register 10–37 having a construction like that of the register 10–21 but having only a 24 bit storage capacity.

The DTP 2 pulse translated by the gate 10–35 is applied to a gate 10–38. At the time the priming pulse is transferred as last described from the 50th core of the register 10–21 to condition the gate 10–35, a busy bit is transferred from core 47 to core 48 of the register. If the busy bit is a One, this transfer will result in gate 10–38 being conditioned to pass the DTP 2 pulse translated by the gate 10–35 and such translated pulse sets flip-flop 10–27 in the One state. The One output circuit of the latter conditions a gate 10–39 to translate the next DTP 2 pulse applied to this gate from the output circuit 2–24 of the timing system. This translated pulse is applied to the gate 10–34 and is translated by the latter provided that the parity of the message which is now stored in the primary shift register 10–21 is even. The DTP 2 pulse translated by the gate 10–34 sets a flip-flop 10–40 in its One state, and the One output circuit of the latter conditions a gate 10–41 to translate the next DTP 4 pulse applied thereto from the output circuit 2–43 of the timing system. This translated pulse resets the flip-flop 10–40 to its Zero state and sets a flip-flop 10–42 to its One state.

In the operation thus far described, it was assumed that the incoming message has correct parity resulting in the flip-flop 10–42 being set in its One state by operation of the gate 10–34 and flip-flop 10–40. The shifting rate of the primary shift register 10–21 during the time that the received message was stored therein is approximately 1,300 cycles per second, or 770 microseconds between shift pulses, as established by the periodicity of the timing pulses received at the input circuit 6–12. The flip-flop 10–42 in its One state operates through a cathode follower 10–43 to condition through the OR unit 10–16 the AND circuit 10–17, and also conditions an AND circuit 10–44. The AND circuit 10–17 is now conditioned to translate MITP 1–2 pulses applied to it through the OR unit 10–18, and since these pulses occur every 20 microseconds there is the result that the primary shift register 10–21 is now shifted at 50 kilocycle rate.

The AND circuit 10–44 is now also conditioned to translate MITP 1–2 pulses which are applied to it from the output circuit 2–57 of the timing system, and these pulses are applied through an OR unit 10–45 and an OR unit 10–46 to respective power cathode followers 10–47 and 10–48. The output of the cathode follower 10–48 through a core shift driver 10–50 energizes the shift windings of each of the cores of the word two core buffer storage register 10–37, whereas the output of the cathode follower 10–47 through a core shift driver 10–49 energizes the shift windings of each of the cores of a word one core buffer storage register 10–61 which is similar in construction to the primary shift register 10–21 except that the unit 10–51 includes only 26 bit storage capacity. Since the output of the highest order core of the primary shift register 10–21 is coupled to the lowest order core of the second word buffer storage register 10–37, and the highest order of the latter is coupled to the lowest order of the word one buffer storage register 10–51, and since the register 10–21 and both the word two storage register 10–37 and word one storage register 10–50 are now being shifted in synchronism at a 50 kilocycle pulse rate by the MITP 1–2 pulses, 50 shift pulses will cause the first word in the message to be read out of the primary shift register 10–21 into the word one buffer register 10–51 and the second word in the message to be read out of the primary shift register 10–21 into the word two buffer register 10–37. Before the end of the fast shift last-mentioned, the timing pulse at the input circuit 6–12 immediately preceding the next Sync pulse at the input circuit 6–13 will occur. This timing pulse, insofar as the primary shift register 10–21 is concerned, is swallowed up by a fast shift pulse inasmuch as it occurs synchronously with the latter.

The 50th shift pulse in the fast shift sequence will cause the priming pulse (which resulted from the Sync pulse at the input circuit 6–13) to be read out of the highest order stage of the word one storage buffer register 10–51, and this pulse is applied to a gate 10–52 to condition the latter to translate the next MITP 2 pulse. This translated pulse sets the flip-flop 10–42 in its Zero state, and in this way the exact required number of 50 shift pulses is obtained by which to read out the message from the primary shift register 10–21 into the word two buffer storage register 10–37 and word one buffer storage register 10–51.

The MITP 2 pulse translated by the gate 10–52 is also used to set a flip-flop 10–53 in its Zero state. The latter thereupon conditions a gate 10–54 to translate the next DTP 1 pulse applied to this gate from the output circuit 2–15 of the timing system. This translated pulse resets the flip-flop 10–53 in its One state and sets a flip-flop 10–55 in its One state. The flip-flop 10–55 in its One state conditions a gate 10–56 to translate the next demand pulse generated by the write status system earlier described and applied through the output circuit 5–19 of the latter to the gate 10–56. At this point it may be noted that it was the priming pulse which conditioned the gate 10–52 to translate the MITP 2 pulse, and 20 microseconds are thus needed for a further fast shift to pass the priming pulse out of the end of the word one buffer register 10–51 before the occurrence of the bufferread-out pulse produced in a manner presently to be described. Since the demand pulse produced in the output circuit 5–19 of the write status system occurs at DTP 3 time, the action of the flip-flop 10–54 insures that any demand pulse translated by the gate 10–56 must occur after DTP 1 time (gate 10–54) thus insuring the required 20 microsecond delay for the last fast shift of the word storage buffer registers.

If the gate 10–56 had not been conditioned by the One state of the flip-flop 10–55 as just described (by completion of fast shift of the message into the word one and word two buffer storage registers 10–37 and 10–51), the flip-flop 10–55 would have remained in its Zero state as set by the preceding demand pulse applied to its Zero input circuit. In its Zero state, the flip-flop 10–55 conditions a gate 10–57 to translate the demand pulse to the output circuit 10–58 of this gate for application to a succeeding one of the data input systems 6—10' or 6—10''. Thus each input system responds to a demand pulse only when a message is stored in its output word buffer registers in readiness for transmission to the write system. This condition of the input system is evidenced by the flip-flop 10–55 being set in the manner earlier explained, thus causing its associated gate 10–57 to shut down and its associated gate 10–56 to open up and translate the demand pulse to set a flip-flop 10–58 in its One state.

When the flip-flop 10–58 is thus set in its One state, the elevated potential of its One output circuit is translated through a cathode follower 10–59 to an AND circuit 10–60. The latter is normally conditioned through a cathode follower 10–61 by the Zero output circuit of a flip-flop 10–62 normally in its Zero state, so that the elevated potential in the One output circuit of the flip-flop 10–58 is normally translated by the AND circuit 10–60 to a gate 10–63 to condition the latter to translate the next DTP 4 pulse applied thereto from the output circuit 2–43 of the timing system. This translated pulse sets the flip-flop 10–62 in its One state, and the elevated potential developed in the One output circuit of the latter operates through a cathode follower 10–64, an OR unit 10–45, the power cathode follower 10–47, and a core shift driver 10–49 to energize the shift windings of each of the cores of the word one buffer register 10–51. This shift current will begin at substantially DTP 4 time, whereas when the message was being shifted out of the primary shift register 10–21 into the word one buffer register 10–51 and word two buffer register 10–37 the shift current began at substantially DTP 1 time. This timing has a further significant result. As will presently be explained more fully in connection with the write system, the one shifted out of the busy bit position of the word one buffer register 10–51 conditions the write system to start writing into drum storage at the immediately succeeding DTP 1 time. It will be shown later that this has the important result that the write system completes writing the message into drum storage only when the busy bit of the word one buffer register 10–51 is a One and only when the busy bit output of this buffer is in response to a shift pulse beginning at DTP 4 time under action of the flip-flop 10–62 in being changed to its One state.

Each core of the word one buffer register 10–51 has its output comprised by an individual circuit of the 22 circuit cable 6–14. Thus, the bits of the stored word in the buffer 10–51 are transmitted in parallel through the cable 6–14 to the write system, and this occurs upon the initial edge of the shift pulse applied by action of the units 10–62, 10–64, 10–45, 10–47 and 10–49 as earlier described.

With the flip-flop 10–62 set in its One state as last described, it conditions a gate 10–65 through the cathode follower 10–64 to translate the next DTP 4 pulse applied thereto from the output circuit 2–43 of the timing system. This translated pulse sets a flip-flop 10–66 in its One state. The One state of the flip-flop 10–66, through a cathode follower 10–67, the OR unit 10–46, the power cathode follower 10–48, and the core shift driver 10–50 energizes the shift winding of all cores of the word two buffer storage register 10–37 to cause a read out operation in the manner previously described with respect to the word one buffer register 10–51. The word two information bits are translated in parallel form through individual conductors of the cable 6–15 to the write system. The One output of the flip-flop 10–66 also conditions a gate 10–68 to translate the next DTP 4 pulse applied thereto from the output circuit 2–43 of the iming system. This translated pulse resets all of the flip-flops 10–58, 10–62, and 10–66 to their Zero state to complete the read out operation.

It should be noted in regard the read out operation described above that the shift current applied to the word one buffer 10–51 as a result of flip-flop 10–62 being in the One state is approximately 20 microseconds and extends from the time that a DTP 4 pulse is translated by the gate 10–63 until the time that the second succeeding DTP 4 pulse is translated by the gate 10–68. It should further be noted that the shift current applied to the word two buffer 10–37 as a result of flip-flop 10–66 being in the One state is approximately 10 microseconds and extends from the time that a DTP 4 pulse is translated by the gate 10–65 until the next DTP 4 pulse is translated by the gate 10–68. These shift currents have sufficiently steep leading edges as to effect read out of the words from buffer storage as earlier mentioned, and are sufficiently long in duration to effect a "clearing" operation of both the buffer storage 10–37 and the buffer storage 10–51. Additionally note that the 20 microsecond pulse applied to the shift windings of the word one buffer storage 10–51 keeps the read out of the word two from the buffer storage 10–37 from storing the first core position of the word one buffer storage 10–51.

A binary coded word identifying the source of the message is developed during the interval that the flip-flop 10–58 is in its One state or, in other words during the entire interval of the read out operation. To this end, the output of the flip-flop 10–58 is applied through the cathode follower 10–59 and a conductor 10–69 to a terminal 10–70 of a multi-terminal socket 10–71. A terminal 10–72 of the socket is energized from a negative potential source, indicated as —E and having a representative value of —30 volts. The socket terminals 10–73, 10–74 and 10–75 are so interconnected by a wired plug (indicated by the arrows) inserted in the socket 10–71 that one or more selected conductors of the source identity cable 6–18 have a positive potential (binary One) impressed upon them from the cathode follower 10–59 through the conductor 10–69, and any remaining conductor has a negative potential (binary Zero) impressed upon it from the potential source —E. As indicated in the drawing by way of example, a 0–1–1 binary coded word identifies the data source supplying the message to the particular input system described above. The plug, used with the socket 10–71, also provides a jumper connection from a socket terminal 10–76 to one of the socket terminals 10–70 or 10–72 to indicate the parity of the source identity word; that is, if the number of ones in the source identity word is even the terminal 10–76 is connected to the terminal 10–70 so that the number of ones including the parity is odd. The terminal 10–76 is connected on one conductor 10–77 of a parity cable 6–24 having two additional conductors 10–78 and 10–79 receiving individual ones of the parity bits of the respective word two buffer storage register 10–37 and the word one buffer storage register 10–51.

By way of further example of the manner in which the source identity word may be distinctively selected for each of the input systems 6–10, 6–10' and 6–10'' (Fig. 6), Fig. 10*a* shows a socket 10–71' which might be used for the source 6–10' and having all of the socket terminals 10–73', 10–74', and 10–75' connected by plug-wired jumpers to the terminal 10–70' energized through the conductor 10–69' to provide a source identity word of the binary form 1–1–1. Since this word includes an odd number of ones, the negatively energized terminal 10–72' of the socket 10–71' is connected by plug jumper to the parity terminal 10–76' to furnish a Zero parity indication.

In connection with the matter of parity, it was pointed out above that the flip-flop 10–25 is initially reset to its Zero state by each received Sync pulse of the Sync input circuit 6–13, and thereafter operates as a binary counter to count the number of 1 bits appearing in a message received at the data input circuit 6–11. If the data count should leave the flip-flop in its One state, contrary to the assumptions made above in connection with the operation of the input system, the gate 10–34 is not conditioned to initiate the fast shift of the registers 10–21, 10–37 and 10–51 and the One output circuit of the flip-flop 10–25 conditions a gate 10–80 to translate the next Sync pulse received at the Sync input circuit 6–13 following the received message. This translated Sync pulse sets an alarm flip-flop 10–81 in its One state and energizes an alarm circuit 10–82 to provide a suitable alarm indicative of the fact that the total number of Ones in the received message including parity is odd and thus that the message was received erroneously for some reason. In this event, the message still in the primary register 10–21 will be cleared when the next message period starts.

Figure 11:
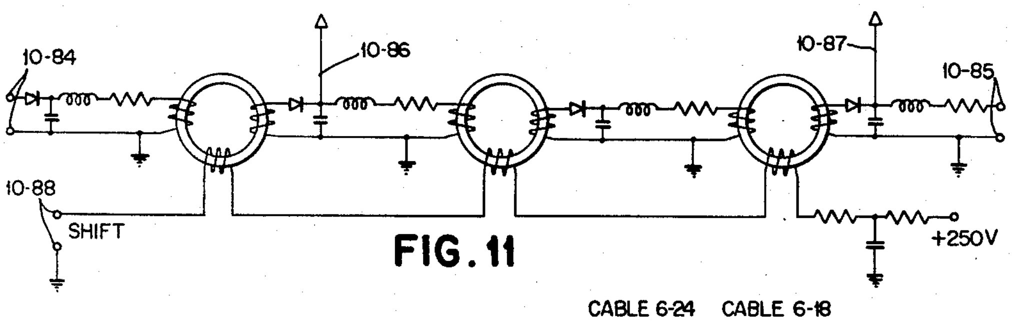
Fig. 11 is a circuit diagram of three stages of a magnetic core register suitable for use in the Fig. 10 system.

As mentioned above, the primary shift register 10–21, the word two buffer storage register 10–37, and the word one buffer storage register 10–51 have a construction essentially similar to that shown and described in the Rising et al. application. Fig. 11 is a circuit diagram showing the electrical arrangement of three core stages of such a register and particularly illustrates the manner in which data information is translated in serial form from the input terminals 10–84 of the first stage of the output terminals 10–85 of the third stage, and further how information may also be supplied in parallel manner concurrently at output circuits 10–86 and 10–87 when a shift current pulse is caused to flow in the shift winding by suitable control at the terminals 10–88.

Read-out from word buffer storage to drum storage can be delayed up to 20.4 milliseconds by the search for an empty drum slot if the entire drum field must be scanned. While the first message is stored in the word buffer registers of one input system, waiting to be read onto the drum, a second message may be read into the primary shift register of that input system without affecting the first message. Reading a message into the primary shift register requires 40 milliseconds. Since the entire drum field can be scanned in half that time, no problem arises unless the field is completely filled and remains filled for two full drum scans. If that should happen, when the second message has filled the primary shift register the "full" signal translated by the latter to the drum demand control unit will generate a drum demand alarm. The word buffer registers will then be cleared of the first message which is lost, allowing the second message to be fast shifted from the primary shift register into the word buffer registers. Thus a drum demand alarm will be generated if a buffer's loaded signal is sent to a drum demand control system followed by the primary shift register full signal with no intervening drum demand pulse.

*Write system*

The write system 6–16 of Fig. 6 has a schematic arrangement shown in Figs. 12 and 13 which should be considered together as a unitary arrangement as shown in Fig. 14.

This system may conveniently be considered as having a message section, a source identity section, a time tag section, a parity section, all of which are shown in Fig. 12, and a write control section shown in Fig. 13. These various sections will now be considered in turn.

The message section includes 22 identical stages, one for each data bit of each message word to be written on the storage drum. In the interest of simplicity, only stages 1, 2, 21 and 22 have been shown and it will be understood that the remaining stages have identical stage arrangements and operation. Each stage includes arranged in tandem in the order named from input to output of the stage, an OR unit 12–10, a level setter 12–11, a gate 12–12 having an output circuit coupled to the One input circuit of a flip-flop 12–13, cathode followers 12–14 and 12–15 for the respective One and Zero output circuits of the flip-flop 12–13, and a dual channel drum writer 12–16 having output circuits connected to individual ones of the One and Zero windings of an individual write head 6–13. As indicated in Fig. 12, each OR unit 12–10 is connected to an individual one of the 22 conductors of the first word cable 6–14 of the input system 6–10 and also to a corresponding individual one of the 22 conductors of the second word cable 6–15. Further, and as indicated in association with the right hand OR unit 12–10, these OR units are also common to individual ones of corresponding conductors of the cables 6–14′ and 6–15′ of the input system 6–10′ and are common to individual ones of corresponding conductors of the cables 6–14″ and 6–15″ of the input system 6–10″.

Thus upon message read out of the first and second word buffers of any of the input systems 6–10, 6–10′ and 6–10″, the data bits of the successively read first and second message words are applied in binary parallel form to the OR units 12–10 of the write system. A clearing pulse generated by the write status system (Fig. 5) is applied through an output circuit 5–35 of the latter to a register driver 12–17, and the output of the latter is applied to the Zero input circuit of all of the flip-flops 12–13 to set them in their Zero state. As will presently be more fully explained, the control section (Fig. 13) of the write system develops a gate sample pulse at DTP 1 time and this pulse is applied through a circuit 12–18 to each of the gates 12–12. If a One information word bit is applied to any gate 12–12 from its corresponding conductor of the cable 6–4 or 6–15 at the gate sample pulse time, the one bit sets the corresponding flip-flop 12–13 in the One state.

The One output potential of each flip-flop which has been set in its One state, and the Zero output potential of those flop-flops which remain in the Zero state after action of the gate sample pulse, are applied through cathode followers 12–14 and 12–15 to the drum writers 12–16. A write pulse is developed in the write status system (Fig. 5) at DTP 3 time and is applied through its output circuit 5–33 to a flip-flop 12–19 to set the latter in its One state, but this flip-flop is almost immediately reset to its Zero state by a DTP 3+1.7 microsecond pulse applied to it from the output circuit 2–34 of the timing system. The resultant 1.7 microsecond pulse developed in the output circuit 12–20 of the flip-flop 12–19 is applied through a drum writer driver 12–21 to each of the drum writers 12–16 to cause the latter to write a One or a Zero depending upon the One or Zero state of its associated flip-flop 12–13. Thus each stage of the message section takes the One bits which become stored in flip-flops 12–13 at the gate sample pulse time (DTP 1), the One bits being presented to the gates 12–12 by any of the input units 6–10, 6–10′, and 6–10″, and beginning at the write pulse time (DTP 3) writes these Ones into storage in a register of the storage drum.

In this regard, and referring to the curves of Fig. 14*a*, it may be noted that the read-out shift current pulses applied to the first and second word buffer storage registers of each input unit begins at DTP 4 time and maximum output potential of any core of the register occurs at DTP 1 time as indicated by curve A. The gate sample pulse applied to the gates 12–12 also occurs at DTP 1 time. On the other hand, read-in to word buffer storage begins at DTP 1 time and reaches maximum value at DTP 2 time as represented by curve B of Fig. 14*a*. Since read-in to any of the word buffer storage registers is done by shift pulse beginning at DTP 1 time and read-out of any of these registers is done by a shift current pulse beginning at DTP 4 time, read-in operations to the word buffer registers of any one or more of the input systems 6–10, 6–10′ and 6–10″ can be accomplished simultaneously with a read out operation which is being accomplished in the word buffer registers of some other of the input systems even though the outputs of all such registers are simultaneously applied through the OR units 12–10 to the gates 12–12.

The source identity section of the write system includes three identical stages each of which has a construction identical to a stage of the message section, has the same mode of operation, and has components which are accordingly designated by the same reference numerals as those of a message stage. In the source identity section, as in the message section, the OR units 12–10 are connected to individual ones of the three conductors of the source identity cable 6–18 and to corresponding conductors of the source identity cables 6–18′ and 6–18″. The source identity stages are cleared by the clearing pulse translated by the unit 12–17, their gates are sampled by the gate sample pulse applied through conductor 12–18, and write in of the source identity information to the drum occurs in response to the write pulse applied to the flip-flop 12–19.

Since the time tag system is common to all of the data input systems as shown in Fig. 6, the 5 conductors of the time tag cable 6–21 terminate in individual gates 12–12 included in individual write stages each of which is essentially similar (except for omission of certain stage input units as indicated in Fig. 12) to the stages of the message section previously described. Accordingly, the components of the time tag section which correspond to components of the message section are identified by the same reference numerals. Each time tag section stage has the same essential mode of operation as the message section stages in that the flip-flops 12–13 of the time tage stages are cleared by the unit 12–17, are gated by the gate sample pulses applied to the gates 12–12, and time tag storage on the storage drum occurs in response to the write pulse applied to the flip-flop 12–19.

The parity section also is similar to a stage of the message section and includes a flip-flop 12–13 to which is applied the parity bit (odd) indication from the parity circuit 6–28, cathode followers 12–14 and 12–15, and a drum writer 12–16. As with the other stages, the flip-flop 12–13 of this section is cleared by the unit 12–17 and parity storage on the drum occurs in response to the write pulse of the units 12–19 and 12–21. The parity indication is written on the storage drum by action of the parity write head 6–33.

In summary of the operation of the write system shown in Fig. 12, successively presented message words from any of the input systems 6–10, 6–10′ and 6–10″ are gated by the gate sample pulse to storage in the write system flip-flops 12–13. At the same time, the source identity word for the particular input system is gated into the flip-flops of the source identity stages, the time tag identifying the time of receipt of the message is gated into the flip-flops of the time tag stages, and the parity information is stored in the flip-flop of the parity section. The information of successive words of a message gated into the write system flip-flops is read into successive registers of the storage drum in response to the write pulse applied to the write system flip-flop 12–19, as is also the source identity word, time tag (which may change as between successive registers) and the parity indication supplied by the parity indicating circuit 6–28.

The write control section of the write system is shown in Fig. 13 and includes an OR unit 13–10 to which is applied the busy bits supplied through the busy cables 6–17, 6–17′ and 6–17″ from the respective input systems 6–10, 6–10′, and 6–10″. At DTP 4 time when each word one or word two is read out of its storage buffer register, a busy bit is read out of the busy bit position of the buffer into the OR unit 13–10 and is translated by the latter through a level setter 13–11 to condition a gate 13–12. The latter thereupon translates the next DTP 1 pulse applied to it from the output circuit 2–15 of the timing system, and this translated pulse is in turn translated by a pulse amplifier 13–13 and a register driver 13–14 to the output circuit 12–18 of the latter to constitute the gate sample pulse earlier mentioned in connection with Fig. 12. The translated DTP 1 pulse of the gate 13–12 is also translated through an OR unit 13–15 and a pulse amplifier 13–16 to constitute a data available pulse in the input circuit 5–28 of the write status system (Fig. 5).

In regard to the generation of this data available pulse, the first DTP1 pulse translated by the gate 13–12 in response to the buty bit of word one is also translated through a gate 13–17 to set a flip-flop 13–18 in its One state and thereby condition a gate 13–19 to translate to the OR unit 13–15 as a data available pulse to the next DTP 1 pulse. This translated DTP1 pulse resets the flip-flop 13–18 in its Zero state, and the Zero output of the latter conditions the gate 13–17 to translate the next DTP 1 pulse of the gate 13–12. Thus it will be noted that two data available pulses are always generated even though the received message contains no second word. The reason for generating two such pulses is to insure that the write status system will generate two write pulses for every demand pulse generated by it even though the message may not contain a second word.

The busy bits translated by the amplifier 13–11 are also translated by an inverter 13–20, a cathode follower 13–21, and an output circuit 13–22 to the parity correction system, presently to be described, to effect a parity correction in the event that the message contains no second word (if there is no second word, there will be no busy bit for the second word).

*Time tag system*

As mentioned above, each word of each message received by a data input system and stored on the storage drum has stored with it a record of the time when the message was received into storage. The system for generating this time identification is referred to herein as a time tag system and has a circuit arrangement schematically shown in Fig. 15.

The time tag system receives from a primary time source, not shown, one pulse every 8 seconds in an input circuit 15–10 and one pulse every 0.25 second in an input circuit 15–11. One of the 0.25 second pulses occurs in time coincidence with each 8 second pulse. The time tag system is essentially a binary counter, the count of which is inspected by each 8 second pulse applied to the input circuit 15–10, which counts quarter-second pulses applied to the input circiut 15–11. To this end, the system includes a plurality of flip-flops 15–12—15–16 each operating in binary fashion in response to pulses applied to a respective input circuit 15–17—15–21. Further these binary counters have pairs of output cathode followers 15–22A—15–26B. As shown in the drawing, the B cathode follower associated with the One output side of the first four flip-flops conditions a respective gate 15–27—15–30 to translate pulses applied to the binary input circuit of a preceding flip-flop to the binary input circuit of the next succeeding flip-flop.

The A cathode followers associated with the Zero output circuits of the flip-flops 15–12—15–16 are all coupled to an OR unit 15–31 which conditions a gate 15–32 whenever any of the flip-flops is in its Zero state. The B cathode followers associated with the One output circuits of the flip-flops are coupled through respective cathode followers 15–33—15–36 to individual conductors of the time-tag cable 6–21 and to an OR unit 15–37 which conditions a gate 15–38 whenever any of the flip-flops is in its One state.

All of the flip-flops 15–12—15–16 should be in their One state at the time of occurrence of each 8 second pulse. Each such 8 second pulse applied to the input circuit 15–10 is translated through a pulse amplifier 15–39 to the gate 15–32 for purposes of inspecting the operation of the counter and ascertaining that all of the flip-fllops 15–12—15–16 are in their One state as required for normal counter operation. Should any one of the flip-flops 15–12—15–16 erroneously be in its Zero state for any reason, the 8 second test pulse is translated by the gate 15–32, is further translated by a pulse amplifier 15–40 and is applied to the One input side of all of the flip-flops in an attempt to correct the erroneous operation of the Zero state flip-flop by resetting it to its One state. The 8 second pulse translated by the unit 15–40 is also applied to an OR unit 15–41 for translation by the latter to operate an alarm, not shown, indicating improper counter operation.

Each one of the quarter-second pulses applied to the input circuit 15–11 is translated by a pulse amplifier 15–42 to set a flip-flop 15–43 in its One state. The One output circuit of the latter conditions a gate 15–44 to translate the next DTP 3 pulse applied to the gate from the output circuit 2–26 of the timing system. Each such translated pulse sets a flip-flop 15–45 in its One state, and this conditions a gate 15–46 to translate the next DTP 1 pulse applied to the gate from the output circuit 2–15 of the timing system. One quarter-second pulse occurs in time coincidence with each 8 second pulse, used as noted above to inspect the counter and assure that all of the flip-flops 15–12—15–16 are in their One state at the time of the 8 second pulse. This quarter-second pulse is not effective immediately to condition the gate 15–46 due to slight delays introduced by the operations of the flip-flops 15–43 and 15–45, so that when the DTP 1 pulse is translated by the gate 15–46 all of the counter flip-flops 15–12—15–16 should be standing in their One state and thus condition all of the gates 15–27—15–30 to open. The DTP 1 pulse last mentioned is accordingly applied to each of the binary input circuits 15–17—15–21 to reset all of the flip-flops to their Zero state and thereby initiate a new cycle of counting the one-quarter second pulses applied to the input circuit 5–11. The DTP 1 pulse of the gate 15–46 is also applied to a flip-flop 15–47 to set the latter in its One state, and thus through a cathode follower 15–48 develop a positive potential in an odd parity output circuit 15–49. It will presently be explained more fully that this potential in the output circuit 15–49 indicates that the total number of binary Ones in the time tag system count of the quarter-second input pulses is odd in number, and an even numbered count sets the flip-flop 15–47 to its Zero state to develop through a cathode follower 15–50 a positive potential in an even parity output circuit 15–51.

The 8 second pulse translated by the pulse amplifier 15–39 in addition to inspecting the counter flip-flops as above explained also sets a flip-flop 15–52 in its One state and this conditions a gate 15–53 to translate the quarter-second pulse next following the 8 second pulse. The quarter-second pulse translated by the gate 15–53 resets the flip-flop 15–52 to its Zero state and also is applied to the gate 15–38. If any of the flip-flops 15–12—15–16 have failed for any reason to be reset to their Zero state by the combined action of the preceding quarter-second pulse and DTP 1 pulse translated by the gate 15–46, the OR unit 15–37 conditions the Zero test gate 15–38 to translate the quarter-second pulse applied thereto and this translated pulse is then translated through the OR unit 15–41 to the alarm circuit to indicate that the counter operation is not correct. Thus an alarm is generated if the counter fails to meet either the Ones test or the Zeros test.

When the quarter-second pulse received at the input circuit 15–11 set the flip-flop 15–45 to its Ones state at DTP 3 time as earlier explained, the gate 15–46 was conditioned to translate the next DTP 1 pulse as previously described and a gate 15–54 is simultaneously conditioned to translate the next DTP 2 pulse applied to this gate from the output circuit 2–24 of the timing system. The latter translated pulse resets the flip-flops 15–43 and 15–45 to their Zero state in preparation for the count of the next quarter-second pulse, and the DTP 2 pulse is also applied to an arrangement of gates 15–55—15–70 which are conditioned as shown individually or in pairs by the output circuits of the flip-flops 15–12—15–16 and also by the output circuits of preceding Ones of these gates. It will be evident from inspection that the DTP 2 pulse translated by the gate 15–54 and applied to the system of gates 15–55—15–70 is translated through successive Ones of the latter to reset the flip-flop 15–47 to its Zero state whenever an even number of the flip-flops 15–12—15–16 are in their One state or otherwise to leave the flip-flop 15–47 in its One state (as so set by the DTP 1 pulse translated by the gate 15–46) whenever an odd number of the flip-flops 15–12—15–16 is in the One state. Thus there is developed in the odd parity output circuit 15–49 and the even parity output circuit 15–51 a positive potential indicative of the odd or even binary count by the time tag system of the quarter-second pulses applied to the input circuit 15–11.

*Parity correction*

It has previously been explained in connection with the input system of Fig. 10 that parity information is sent with each message and is used in ascertaining that the message is received in entirety without omission of an information bit. If the parity check of the input system indicates accurate receipt of the message information, the latter is stored in the word storage buffer registers in readiness to be stored on the storage drum.

Further, and as also earlier explained, there is stored with the message on the drum information providing the source identity of the message and information of the time of storage on the drum. This source or site identity and time-of-storage information newly added at the storage system also includes a plurality of information bits, and a parity information bit is stored with the sum total of all stored information for use at a later time in ascertaining that the stored information is accurately read out in entirety from storage. The parity correction system which derives the parity bit for drum storage is shown schematically in Fig. 16.

The parity bit associated with each word of the message and the parity information identifying the source or site of the message is translated through 3 conductors of a cable 6–24, 6–24′, and 6–24″ from the three message input systems 6–10, 6–10′, and 6–10″ to the parity correction system. The word parity bits supplied to the parity correction system through the conductors 10–78 and 10–79 of the input system 6–10, and likewise through the conductors 10–78′ and 10–79′ of the input system 6–10′ and the conductors 10–78″ and 10–79″ of the input system 6–10″, are translated through an OR unit 16–10 to a level setter 16–11. The output potential of the latter is translated through a cathode follower 16–12 to condition an AND circuit 6–13 and is also translated through an inverter 16–14 and a cathode follower 16–15 to condition an AND circuit 16–16.

The site identity parity information supplied through the conductors 10–77, 10–77′ and 10–77″ from the respective input systems 6–10, 6–10′ and 6–10″ are applied to a site OR unit 16–17. Any potential developed in the output circuit of the latter unit is translated through a cathode follower 16–18 to condition an AND circuit 16–19 and is also translated through an inverter 16–20 and a cathode follower 16–21 to condition an AND circuit 16–22. The AND circuit 16–19 is further conditioned by the even parity potential of the time tag system output circuit 15–51, and the AND circuit 16–22 is likewise further conditioned by the odd parity potential of the time tag system output circuit 15–49. Thus whenever the sit parity information has even parity output translated through the site OR unit 16–17 and cathode follower 16–18 to the AND circuit 16–19 while concurrently the time tag system has even parity output, the AND circuit 16–19 opens and translates a positive potential through an OR unit 16–23 to a level setter 16–24. The positive output potential of the latter is translated through a cathode follower 16–25 to condition the AND circuit 16–16, and the absence of positive output potential of the amplifier 16–24 is translated through an inverter 16–26 and a cathode follower 16–27 to condition the AND circuit 16–13.

The AND circuit 16–16 thus develops a positive output potential whenever there is (1) even parity of the site identity information, (2) even parity of the time tag system count (opening AND circuit 16–19), and (3) even parity of either word of a message translated to storage in the storage system. This is likewise true if the site identity has odd parity, the time tag system has odd parity count (opening AND circuit 16–22), and either word parity is even. The AND circuit 16–13 in similar fashion develops an output potential if either the side identity parity and time tag parity is even while the other is odd and if the parity of either word of the message is odd.

The outputs of the AND circuits 16–13 and 16–16 are translated through an OR unit 16–29 and a cathode follower 16–30 to condition a gate 16–31, which is opened by a data available pulse applied to this gate through the output circuit 5–28 of the write control section (Fig. 13) of the write system. The output of the gate 16–31 is translated through an OR unit 16–32 and a pulse amplifier 16–33 to the odd parity bit circuit 6–28 as parity information supplied to the write system. In the event that there is no second word in the received message, the write control section (Fig. 13) of the write system applies through its output circuit 13–22 to a gate 16–34 a conditioning potential, and this gate likewise is opened by a data available pulse applied to it from the data available output circuit 5–28 of the write control section. The output of the gate 16–34 is likewise translated through the OR unit 16–32 and pulse amplifier 16–33 as second word parity information to the output circuit 6–28 for use by the write system.

*Component construction*

The constructions and modes of operation of the "A" type gate and of the cathode followers of types "B", "C," "E," "F," "G," and 'H" are disclosed in the copending application Serial No. 471,002, filed November 24, 1954, in the names of Harold D. Ross et al., entitled Electronic Data Processing Machine, and assigned to the same assignee as the present application. The "A" type of flip-flop is also shown and described in the Ross et al. application. The "C" type of flip-flop, the register driver "RD" and the drum write driver "DWD" units are shown and described in the aforementioned Everett et al. application. The "B" type of flip-flop is disclosed in the copending application Serial No. 473,874, filed December 8, 1954, in the name of R. E. Nienburg, entitled Electronic Ring Circuit, and assigned to the same assignee as the present application. A suitable core shift driver "CSD" is disclosed in the aforementioned Rising et al. application.

The circuit arrangement of the type "GG" power cathode follower is shown in Fig. 17. This arrangement includes a conventional input cathode follower stage 17–10 coupled to a cathode-input type of amplifier stage 17–11 also of conventional arrangement. The output circuit of the amplifier stage 17–11 is coupled through a condenser 17–12 to a cathode follower stage 17–13 through a parasitic suppressor resistor 17–14. The cathode circuit of this stage includes parallel connected cathode resistors 17–15 and is coupled to a source of negative potential indicated as −150 volts. The signal voltage developed across the cathode resistors 17–15 is supplied to the output circuit of the power cathode follower as shown, and the output circuit potential is limited to −30 volts by a diode rectifier 17–16 and to +10 volts by parallel-connected diode rectifiers 17–17.

The "A" type of level setting amplifier has the circuit arrangement shown in Fig. 18 and includes a cathode follower input stage 18–10 coupled to a cathode-input amplifier stage 18–11. The amplifier stage 18—11 is coupled through a unidirectional coupling circuit, comprised by a resistor 18–12 and shunt-connected condenser 18–13, to a cathode follower stage 18–14. The latter includes an output circuit 18–15 coupled across the cathode load resistors of the stage and comprised by series-connected resistors 18–16, 18–17, and 18–18. The input signal amplitude to the cathode follower stage is limited to a predetermined negative voltage level by a diode rectifier 18–19 which is connected between the input circuit of the cathode follower stage and the junction of the cathode resistors 18–16 and 18–17, the voltage developed at the junction of these resistors establishing the limiting negative voltage level of the input. The signal voltage developed in the output circuit 18–15 of the cathode follower stage is limited in positive voltage amplitude to 10 volts as controlled by a diode rectifier 18–20 connected between the output circuit 18–15 and a source of potential of +10 volts, and the signal output amplitude is limited in negative amplitude to −30 volts as controlled by a diode rectifier 18–21 connected between the output circuit 18–15 and a source of potential of −30 volts. The "B" form of level setting amplifier has a circuit arrangement shown in Fig. 19, and it will be seen that this form of level setter has the same circuit arrangement and mode of operation as that described in connection with Fig. 18 except for certain differences of component values as shown in these two figures. It is the purpose of both types of level setting amplifiers to restore the level of unidirectional signal after it has been deteriorated by passing through several levels of switching and cathode followers. Both types of level setting amplifiers are essentially overdriven amplifiers with cathode follower outputs which restore deteriorated unidirectional volts to preselected or standard unidirectional levels. The extremes of deterioration can be zero volts and −8 volts for the type "A" level setting amplifier and +6 volts and −11 volts for the type "B" level setting amplifier.

While a specific form of the invention has been described for purposes of illustration, it is contemplated that numerous changes may be made without departing from the spirit of the invention.

What is claimed is:

1. A data storage system comprising, storage means having a plurality of multi-bit-word data storage compartments successively selectable for data storage translation, means providing translation accessibility indicia corresponding to individual successive ones of said compartments, and means including counting means responsive to said indicia for effecting data storage translation by groups of said compartments of which each group includes a preselected number of successive compartments.

2. A data storage system comprising, storage means having a plurality of multi-bit-word data storage compartments successively selectable for data storage translation, means providing translation accessibility indicia corresponding to individual successive ones of said compartments, means for counting said indicia, and means controlled by said counting means for effecting data storage translation by groups of said compartments of which each group includes a preselected number of successive compartments.

3. A data storage system comprising, storage means having a plurality of multi-bit-word data storage compartments successively selectable for data storage translation, means providing translation accessibility indicia corresponding to individual successive ones of said compartments, means for counting said indicia to establish groups thereof of which each group includes a predetermined number of said indicia, and means controlled by said counting means for effecting data storage translation by groups of said compartments of which each group thereof corresponds to and is identified by an individual one of said groups of indicia.

4. A data storage system comprising, storage means having a plurality of multi-bit-word data storage compartments successively selectable for data storage translation, means providing translation accessibility indicia corresponding to individual successive ones of said compartments, a binary counter for counting said indicia to establish successive pairs thereof, and means controlled by said counter for effecting data storage translation by pairs of said compartments of which each pair thereof corresponds to and is identified by an individual pair of said indicia.

5. A data storage system comprising, storage means having a plurality of multi-bit-word data storage compartments successively selectable for data storage translation, means providing translation accessibility indicia corresponding to individual successive ones of said compartments, a bistable multivibrator responsive to a preselected one of said indicia for assuming one bistable operating state thereof and responsive in binary manner to indicia succeeding said one indicia for alternating between its bistable operating states, and means controlled by a preselected one of said bistable operating states of said multivibrator for effecting data storage translation by pairs of said data storage compartments.

6. A data storage system comprising, storage means having a plurality of multi-bit-word data storage compartments successively selectable for data storage translation, indicating means for providing an index indication of translation accessibility of a predetermined one of said compartments and succeeding indications of translation accessibility of individual successive compartments in the order of their accessibility with relation to said one compartment, counting means responsive to said index indication for initiating a count of said succeeding indications, and means controlled by said counting means for effecting data storage translation by groups of said compartments of which each group includes a preselected number of successive compartments.

7. A data storage system comprising, storage means having a plurality of multi-bit-word data storage compartments successively selectable for data storage translation, indicating means for providing an index indication of translation accessibility of a predetermined one of said compartments and succeeding indications of translation accessibility of individual successive compartments in the order of their accessibility with relation to said one compartment, counting means responsive to said index indication for initiating a count of said succeeding indications, and means controlled by said counting means for restricting data storage translation to translation by groups of said compartments of which each group includes a preselected number of successive compartments.

8. A data storage system comprising, storage means having a plurality of multi-bit-word data storage registers successively selectable for data storage translation, indicating means for providing an index indication of translation accessibility of a predetermined one of said registers and succeeding indications of translation accessibility of individual successive registers in the order of their accessibility with relation to said one register, counting means responsive to said index indication for initiating a count of said succeeding indications, and means controlled by said counting means for effecting data storage translation by groups of said registers of which each group includes a preselected number of successive registers.

9. A data storage system comprising, storage means having a plurality of multi-bit-word data storage compartments successively selectable for translation of data into storage in each thereof, indicating means for providing an index indication of translation accessibility of a predetermined one of said compartments and succeeding indications of translation accessibility of individual successive compartments in the order of their accessibility with relation to said one compartment, counting means responsive to said index indication for initiating a count of said succeeding indications, means providing signals indicative of compartment availability, and means responsive to said compartment availability signals and controlled by said counting means for effecting translation of data into storage in groups of said compartments of which each group includes a preselected number of successive compartments.

10. A data storage system comprising, storage means having a plurality of multi-bit-word data storage compartments successively presented for data storage translation, indicating means for providing an index indication of translation accessibility of a predetermined one of said compartments and succeeding indications of translation accessibility of individual successive compartments in the order of their accessibility with relation to said one compartment, counting means responsive to said index indication for initiating a count of said succeeding indications, and means controlled by said counting means for effecting data storage translation by groups of said successively presented compartments of which each group includes a preselected number of successively presented compartments.

11. A data storage system comprising, a rotatable magnetic storage drum having a plurality of multi-bit-word data storage compartments successively presented for data storage translation by rotation of said drum, indicating means for providing an index indication of translation accessibility of a predetermined one of said compartments corresponding to a predetermined angular position of rotation of said drum and succeeding indications of translation accessibility of individual successive compartments corresponding to predetermined successive angular positions of rotation of said drum, counting means responsive to said index indication for initiating a count of said succeeding indications, and means controlled by said counting means for effecting data storage translation by groups of said compartments of which each group includes a preselected number of successive compartments.

12. A data storage system comprising, storage means having a plurality of multi-bit-word data storage compartments successively selectable for data storage translation, control effect generating means for providing an index control effect indicating translation accessibility of a predetermined one of said compartments and succeeding control effects indicating translation accessibility of individual successive compartments in the order of their accessibility with relation to said one compartment, counting means responsive to said index control effect for initiating a count of said succeeding control effects, and means controlled by said counting means for effecting data storage translation by groups of said compartments of which each group includes a preselected number of successive compartments.

13. A data storage system comprising, storage means having a plurality of multi-bit-word data storage compartments successively selectable for data storage translation, electrical control signal generating means for providing an index signal indicating translation accessibility of a predetermined one of said compartments and a signal distinctively indicating translation accessibility of individual successive compartments in the order of their accessibility with relation to said one compartment, counting means responsive to said index signal for initiating a count of said distinctive indications of said second signal, and means controlled by said counting means for effecting data storage translation by groups of said compartments of which each group includes a preselected number of successive compartments.

14. A data storage system comprising, storage means having a plurality of multi-bit-word data storage compartments successively selectable for data storage translation, electrical pulse signal generating means for providing an index pulse indicative of the translation accessibility of a predetermined one of said compartments and succeeding pulses indicative of the translation accessibility of individual successive compartments in the order of their accessibility with relation to said one compartment, electrical pulse counting means responsive to said index pulse for initiating a count of said succeeding pulses, and means controlled by said counting means for effecting data storage translation by groups of said compartments of which each group includes a preselected number of successive compartments.

15. A data storage system comprising, storage means having a plurality of multi-bit-word data storage compartments successively selectable for data storage translation, indicating means for providing an index indication of translation accessibility of a predetermined one of said compartments and succeeding indications of translation accessibility of individual successive compartments in the order of their accessibility with relation to said one compartment, counting means having a cyclic operation initiated in response to said index indication and continuing in response to said succeeding indications to effect a count thereof, and means controlled by said counting means for effecting data storage translation by groups of said compartments of which each group includes a preselected number of successive compartments.

16. A data storage system comprising, storage means having a plurality of multi-bit-word data storage compartments successively selectable for data storage translation, indicating means for providing an index indication of translation accessibility of a predetermined one of said compartments and succeeding indications of translation accessibility of individual successive compartments in the order of their accessibility with relation to said one compartment, counting means having a cyclic operation initiated in response to said index indication and continuing through successive cycles in response to said succeeding indications to count for each said cycle thereof a corresponding group of said indications of which each group includes a predetermined number of said indications, and means controlled by said counting means for effecting data storage translation by groups of said compartments of which each group thereof corresponds to and is identified by an individual one of said groups of indications.

17. A data storage system comprising, storage means having a plurality of multi-bit-word data storage compartments successively selectable for data storage translation, indicating means for providing an index indication of translation accessibility of a predetermined one of said compartments and succeeding indications of translation accessibility of individual successive compartments in the order of their accessibility with relation to said one compartment, a binary two step counter having a cyclic operation initiated in response to said index indication and continuing through successive cycles in response to said succeeding indications to count for each said cycle thereof a corresponding group of two said indications, and means controlled by said counting means for effecting data storage translation by pairs of said compartments of which each pair thereof corresponds to and is identified by an individual one of said groups of indications.

18. A data storage system comprising, storage means having a plurality of multi-bit-word data storage compartments successively selectable for data storage translation, indicating means for providing an index indication of translation accessibility of a predetermined one of said compartments and succeeding indications of translation accessibility of individual successive compartments in the order of their accessibility with relation to said one compartment, a bistable multivibrator responsive to said index indication for assuming one bistable operating state and responsive in binary manner to said succeeding indications for alternating between its bistable operating states, and means controlled by a preselected one of said bistable operating states of said multivibrator for effecting data storage translation by pairs of said compartments.

References Cited in the file of this patent

UNITED STATES PATENTS

| | | |
|---|---|---|
| 2,614,169 | Cohen | Oct. 14, 1952 |
| 2,680,239 | Daniels | June 1, 1954 |
| 2,700,755 | Burkhart | Jan. 25, 1955 |
| 2,702,380 | Brustman | Feb. 15, 1955 |
| 2,817,072 | Chien et al. | Dec. 17, 1957 |

UNITED STATES PATENT OFFICE

CERTIFICATE OF CORRECTION

April 5, 1960

Patent No. 2,932,010

Rollin P. Mayer et al.

It is hereby certified that error appears in the printed specification of the above numbered patent requiring correction and that the said Letters Patent should read as corrected below.

Column 1, line 43, for "in" read -- is --; column 16, line 14, for "10-61" read -- 10-51 --; line 23, for "10-50" read -- 10-51 --; column 17, lines 74 and 75, for "iming" read -- timing --; column 20, line 1, for "6-13" read -- 6-31 --; column 21, line 27, for "tage" read -- tag --; line 61, after "busy", second occurrence, insert -- bit --; column 22, line 7, for "buty" read -- busy --.

Signed and sealed this 13th day of September 1960.

(SEAL)

Attest:

KARL H. AXLINE

Attesting Officer

ROBERT C. WATSON

Commissioner of Patents